US008909576B2

(12) United States Patent
Akopyan et al.

(10) Patent No.: US 8,909,576 B2
(45) Date of Patent: Dec. 9, 2014

(54) NEUROMORPHIC EVENT-DRIVEN NEURAL COMPUTING ARCHITECTURE IN A SCALABLE NEURAL NETWORK

(75) Inventors: Filipp Akopyan, New Windsor, NY (US); John V. Arthur, Mountain View, CA (US); Rajit Manohar, Ithaca, NY (US); Paul A. Merolla, Palo Alto, CA (US); Dharmendra S. Modha, San Jose, CA (US); Alyosha Molnar, Ithaca, NY (US); William P. Risk, III, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 13/235,341

(22) Filed: Sep. 16, 2011

(65) Prior Publication Data

US 2013/0073497 A1    Mar. 21, 2013

(51) Int. Cl.
*G06N 3/04* (2006.01)
*G06N 3/063* (2006.01)

(52) U.S. Cl.
CPC .............. *G06N 3/049* (2013.01); *G06N 3/063* (2013.01)
USPC .......................................................... 706/27

(58) Field of Classification Search
None
See application file for complete search history.

(56) References Cited

U.S. PATENT DOCUMENTS

| 4,686,989 | A | * | 8/1987 | Smyth et al. ............ 607/14 |
| 4,893,255 | A | * | 1/1990 | Tomlinson, Jr. .......... 706/35 |
| 4,965,800 | A | * | 10/1990 | Farnbach ................ 714/724 |
| 5,083,285 | A |   | 1/1992 | Shima et al. |
| 5,091,872 | A | * | 2/1992 | Agrawal .................. 703/14 |
| 5,155,802 | A |   | 10/1992 | Mueller et al. |
| 5,336,937 | A |   | 8/1994 | Sridhar et al. |
| 5,381,515 | A |   | 1/1995 | Platt et al. |
| 5,404,556 | A |   | 4/1995 | Mahowald et al. |
| 6,557,070 | B1 |   | 4/2003 | Noel, Jr. |
| 6,710,623 | B1 |   | 3/2004 | Jones et al. |
| 7,259,587 | B1 |   | 8/2007 | Schmit et al. |
| 7,392,230 | B2 |   | 6/2008 | Nugent |
| 7,426,501 | B2 |   | 9/2008 | Nugent |

(Continued)

FOREIGN PATENT DOCUMENTS

EP    0569764 A2    11/1993

OTHER PUBLICATIONS

Brette et al., "Simulation of networks of spiking neurons: A review of tools and strategies," J Comput Neurosci (2007) 23:349-398.*

(Continued)

*Primary Examiner* — Kakali Chaki
*Assistant Examiner* — Fuming Wu
(74) *Attorney, Agent, or Firm* — Kenneth L. Sherman, Esq.; Michael Zarrabian, Esq.; Sherman & Zarrabian LLP

(57) ABSTRACT

An event-driven neural network includes a plurality of interconnected core circuits is provided. Each core circuit includes an electronic synapse array has multiple digital synapses interconnecting a plurality of digital electronic neurons. A synapse interconnects an axon of a pre-synaptic neuron with a dendrite of a post-synaptic neuron. A neuron integrates input spikes and generates a spike event in response to the integrated input spikes exceeding a threshold. Each core circuit also has a scheduler that receives a spike event and delivers the spike event to a selected axon in the synapse array based on a schedule for deterministic event delivery.

12 Claims, 19 Drawing Sheets

(56) References Cited

U.S. PATENT DOCUMENTS

| | | | |
|---|---|---|---|
| 7,457,787 B1 | 11/2008 | Furber | |
| 7,502,769 B2 | 3/2009 | Nugent | |
| 7,512,572 B2 | 3/2009 | Furber | |
| 7,599,895 B2 | 10/2009 | Nugent | |
| 7,657,313 B2* | 2/2010 | Rom | 607/17 |
| 7,818,273 B2 | 10/2010 | Ananthanarayanan et al. | |
| 7,877,342 B2 | 1/2011 | Buscema | |
| 8,250,010 B2* | 8/2012 | Modha et al. | 706/25 |
| 8,447,407 B2* | 5/2013 | Talathi et al. | 607/45 |
| 8,447,714 B2 | 5/2013 | Breitwisch et al. | |
| 2006/0235477 A1* | 10/2006 | Rom | 607/9 |
| 2008/0275832 A1* | 11/2008 | McDaid et al. | 706/33 |
| 2009/0292661 A1 | 11/2009 | Haas | |
| 2009/0313195 A1 | 12/2009 | McDaid et al. | |
| 2010/0220523 A1* | 9/2010 | Modha et al. | 365/167 |
| 2010/0299296 A1* | 11/2010 | Modha et al. | 706/25 |
| 2011/0130797 A1* | 6/2011 | Talathi et al. | 607/3 |
| 2011/0153533 A1* | 6/2011 | Jackson et al. | 706/17 |
| 2012/0036099 A1* | 2/2012 | Venkatraman et al. | 706/27 |
| 2012/0084240 A1* | 4/2012 | Esser et al. | 706/27 |
| 2012/0084241 A1* | 4/2012 | Friedman et al. | 706/27 |
| 2012/0109863 A1* | 5/2012 | Esser et al. | 706/25 |
| 2012/0109864 A1* | 5/2012 | Modha | 706/25 |
| 2012/0109866 A1* | 5/2012 | Modha | 706/28 |
| 2012/0173471 A1* | 7/2012 | Ananthanarayanan et al. | 706/25 |
| 2012/0259804 A1* | 10/2012 | Brezzo et al. | 706/25 |
| 2013/0031040 A1* | 1/2013 | Modha | 706/27 |
| 2013/0073497 A1* | 3/2013 | Akopyan et al. | 706/27 |
| 2013/0226851 A1* | 8/2013 | Hunzinger et al. | 706/25 |
| 2013/0325765 A1* | 12/2013 | Hunzinger | 706/15 |
| 2013/0325767 A1* | 12/2013 | Hunzinger | 706/16 |
| 2014/0032460 A1* | 1/2014 | Cruz-Albrecht et al. | 706/16 |
| 2014/0074761 A1* | 3/2014 | Hunzinger | 706/15 |
| 2014/0114893 A1* | 4/2014 | Arthur et al. | 706/25 |

OTHER PUBLICATIONS

Makino et al., "A Discrete-Event Neural Network Simulator for General Neuron Models," Neural Comput & Apollo (2003)11:210-223.*

Boucheny et al., "Real-Time Spiking Neural Network: An Adaptive Cerebellar Model," J. Cabestany, A. Prieto, and D.F. Sandoval (Eds.): IWANN 2005, LNCS 3512, pp. 136-144, 2005.*

Merolla et al., "Expandable Networks for Neuromorphic Chips," IEEE Transactions on Circuits and Systems—I: Regular Papers, vol. 54, No. 2, Feb. 2007.*

Yudanov et al., "GPU-Based Simulation of Spiking Neural Networks with Real-Time Performance & High Accuracy," WCCI 2010 IEEE World Congress on Computational Intelligence Jul. 18-23, 2010—CCIB, Barcelona, Spain.*

Marian et al., "Efficient event-driven simulation of spiking neural networks," In Proceedings of the 3rd WSEAS International Conference on Neural Networks and Applications, 2002.*

Rochel et al., "An event-driven framework for the simulation of networks of spiking neurons," In Proceedings of European Symposium on Artificial Neural Networks Bruges (Belgium), Apr. 23-25, 2003, pp. 295-300.*

Garrido et al., "Event and Time Driven Hybrid Simulation of Spiking Neural Networks," J. Cabestany, I. Rojas, and G. Joya (Eds.): IWANN 2011, Part I, LNCS 6691, pp. 554-561, 2011.*

Djurfeldt, "Large-scale Simulation of Neuronal Systems," Doctoral Thesis, 200 pages, Royal Institute of Technology, Stockholm, Sweden 2009.*

Leibold, "Mapping time," Biological Cybernetics, 87, pp. 428-439, 2002.*

Merolla, P.A. et al., "Expandable Networks for Neuromorphic Chips," IEEE Transactions on Circuits and Systems—I: Regular Papers, Feb. 2007, pp. 301-311, vol. 54, No. 2, IEEE, United States.

Boahen, K.A., "Point-to-Point Connectivity Between Neuromorphic Chips Using Address Events," IEEE Transactions on Circuits and Systems—II: Analog and Digital Signal Processing, May 2000, pp. 416-434, vol. 47, No. 5, IEEE, United States.

Patel, G.N. et al., "An Asynchronous Architecture for modeling Intersegmental Neural Communication," IEEE Transactions on Very Large Scale Integration (VLSI) Systems, Feb. 2006, pp. 97-110, vol. 14, No. 2, IEEE, United States.

Mezard, M. et al., "Learning in feedforward layered networks: the tiling algorithm," Journal of Physics A: Mathematical and General, 1989, pp. 2191-2203, vol. 22, No. 12, IOP Publishing Ltd., United Kingdom.

Lazzaro, J. et al., "Silicon auditory processors as computer peripherals," IEEE Transactions on Neural Networks, May 1993, pp. 523-528, vol. 4, No. 3, IEEE, United States.

Arthur, John V., et al., U.S. Appl. No. 12/963,558, filed Dec. 8, 2010, entitled "Integrate and Fire Electronic Neurons", 65 pp., United States.

Arthur, J.V. et al., "Learning in Silicon: Timing is Everything", Advances in Neural Information Processing Systems 18, 2006, pp. 1-8, MIT Press, United States.

Boahen, K.A., "A Burst-Mode Word-Serial Address-Event Link—I: Transmitter Design", IEEE Transactions on Circuits and Systems—I: Regular Papers, Jul. 2004, pp. 1269-1280, vol. 51, No. 7, IEEE, United States.

Karmarkar, U.R. et al., "Mechanisms and significance of spike-timing dependent plasticity", Biological Cybernetics, Jan. 28, 2002, pp. 373-382, vol. 87, No. 5-6, Springer-Verlag, Germany.

Martin, A.J. "Asynchronous Datapaths and the Design of an Asynchronous Adder", Formal Methods in System Design, 1992, pp. 1-24, vol. 1:1, Kluwer, United States.

Rast, A.D., et al., "Virtual Synaptic Interconnect Using an Asynchronous Network-on-Chip", Proceedings of the 2008 International Joint Conference on Neural Networks (IJCNN 2008), Jun. 1-8, 2008, pp. 2727-2734, IEEE, United States.

Arbib, M.A., "The Handbook of Brain Theory and Neural Networks" Massachusetts Institute of Technology, pp. 1-650, 2nd Edition, United States, copyright: 2003 MIT.

Arbib, M.A., "The Handbook of Brain Theory and Neural Networks" Massachusetts Institue of Technology, pp. 651-1301, 2nd Edition, United States, copyright 2003 MIT.

Linares-Barranco, B. et al., "Exploiting Memristance for Implementing Spike-Time-Dependent-Plasticity in Neuromorphic Nanotechnology Systems", Proceedings of the 2009 IEEE Conference on Nanotechnology (IEEE-NANO 2009), Jul. 26-30, 2009, pp. 601-604, IEEE, United States.

U.S. Non-Final Office Action for U.S. Appl. No. 13/149,754 mailed Jul. 8, 2013.

U.S. Notice of Allowance for U.S. Appl. No. 13/149,754 mailed Feb. 24, 2014.

Lin, J. et al., "A Delay-Insensitive, Address-Event Link", Proceedings of the 2009 15th IEEE Symposium on Asynchronous Circuits and Systems (ASYNC'09), May 17-20, 2009, pp. 55-62, United States.

Boahen, K.A., "Point-to-Point Connectivity Between Neuromorphic Chips Using Address Events," IEEE Transactions on Circuits and Systems—II: Analog and Digital Signal Processing, 1999, pp. 100-117, vol. XX, No. Y, StandfordUniversity, United States [downloaded: http://www.stanford.edu/group/brainsinsilicon/pdf/00_journ_IEEEtsc_Point.pdf].

U.S. Final Office Action for U.S. Appl. No. 13/149,754 mailed Dec. 11, 2013.

* cited by examiner

US 8,909,576 B2

NEUROMORPHIC EVENT-DRIVEN NEURAL COMPUTING ARCHITECTURE IN A SCALABLE NEURAL NETWORK

This invention was made with Government support under HR0011-09-C-0002 awarded by Defense Advanced Research Projects Agency (DARPA). The Government has certain rights in this invention.

BACKGROUND

The present invention relates to neuromorphic and synaptronic systems, and in particular neuromorphic and synaptronic event driven circuits for neural networks.

Neuromorphic and synaptronic systems, also referred to as artificial neural networks, are computational systems that permit electronic systems to essentially function in a manner analogous to that of biological brains. Neuromorphic and synaptronic systems do not generally utilize the traditional digital model of manipulating 0s and 1s. Instead, neuromorphic and synaptronic systems create connections between processing elements that are roughly functionally equivalent to neurons of a biological brain. Neuromorphic and synaptronic systems may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention provide event-driven neural architecture for neural networks. According to an embodiment of the invention, a neural network comprises a plurality of interconnected core circuits. Each core circuit comprises an electronic synapse array comprising multiple digital synapses interconnecting a plurality of digital electronic neurons, a synapse interconnecting an axon of a pre-synaptic neuron with a dendrite of a post-synaptic neuron, wherein a neuron integrates input spikes and generates a spike event in response to the integrated input spikes exceeding a threshold. The core circuit further comprises a scheduler that receives a spike event and delivers the spike event to a selected axon in the synapse array based on a schedule for deterministic event delivery.

These and other features, aspects and advantages of the present invention will become understood with reference to the following description, appended claims and accompanying figures.

DETAILED DESCRIPTION

Figure 1:
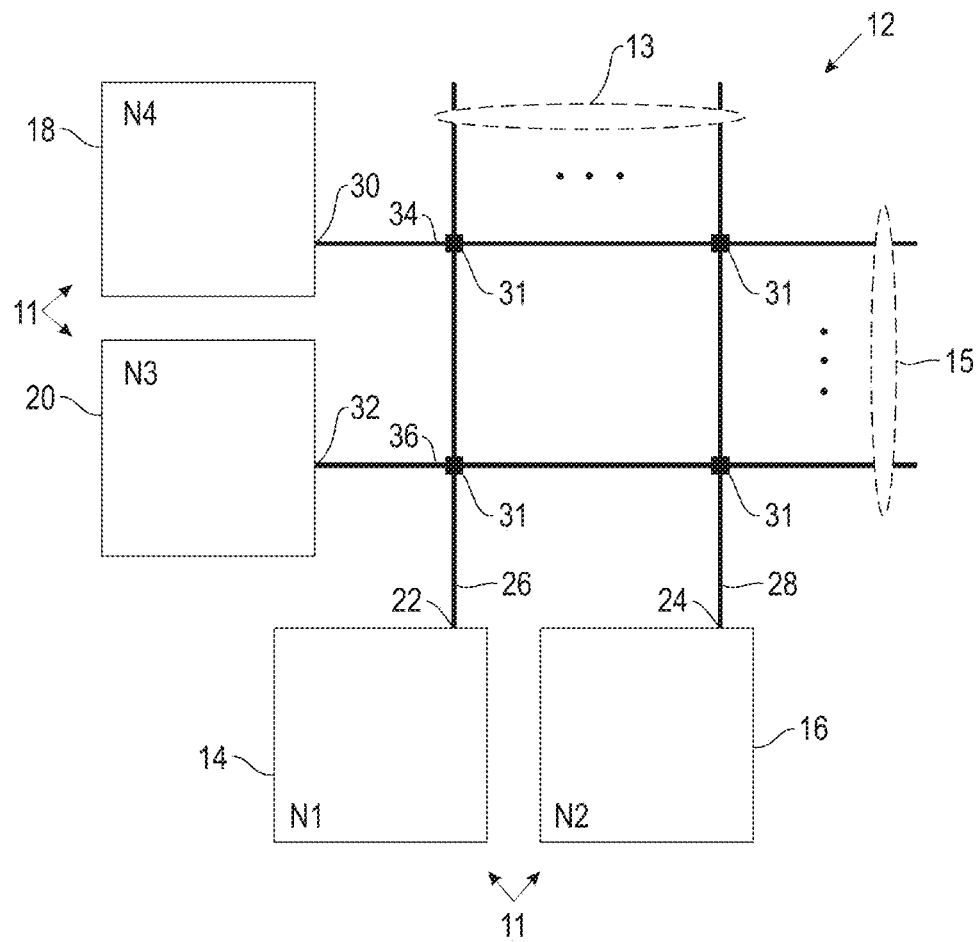
FIG. 1 shows a diagram of a neuromorphic and synaptronic network comprising a crossbar of electronic synapses interconnecting electronic neurons and axons, in accordance with an embodiment of the invention.

Embodiments of the invention provide neuromorphic and synaptronic event-driven neural computing architectures in scalable neural networks. One embodiment provides a low-power event-driven neural computing architecture for a neural network comprising a low-power digital complementary metal-oxide-semiconductor (CMOS) spiking circuit implementing learning rules such as STDP on a crossbar memory synapse array interconnecting electronic neurons.

The term electronic neuron as used herein represents an architecture configured to simulate a biological neuron. An electronic neuron creates connections between processing elements that are roughly functionally equivalent to neurons of a biological brain. As such, a neuromorphic and synaptronic system comprising electronic neurons according to embodiments of the invention may include various electronic circuits that are modeled on biological neurons. Further, a neuromorphic and synaptronic system comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic system according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment, or an embodiment containing both hardware and software elements.

According to an embodiment of the invention, a neuromorphic network comprises multiple interconnected neuromorphic core circuits in a scalable low power network. Each core circuit (core) comprises a tile circuit (tile) having a plurality of electronic neurons and an electronic synapse array of multiple electronic synapses, such as digital synapses, interconnecting the electronic neurons (such as digital neurons).

In each tile within a core, each synapse interconnects an axon of a pre-synaptic neuron with a dendrite of a post-synaptic neuron. Each neuron integrates input spikes and generates a spike event in response to the integrated input spikes exceeding a threshold. A neuron communicates with an axon in another (or the same) core by sending a spike event, encoded as an n-bit address representing its target axon, where the number of bits corresponds to the logarithm base 2 of number of axons in the core. Addresses are sent sequentially to a receiving core where a decoder then selects the corresponding target axon (1 out of 2^n). A controller coordinates events from the synapse array to the neurons, and signals when neurons may compute their spike events within each timestep, ensuring one-to-one correspondence with an equivalent simulation model (such as software or program code simulation).

The controller sequences spike event activity within each timestep for operation of the neural network and access to the synapse array in a continuous or discrete time manner, such that in the discrete-time case deterministic operation is guaranteed. The synapse array includes an interconnecting crossbar that sequentially receives spike events from axons, wherein one axon at a time drives (e.g., transmits signals to) the crossbar, and the crossbar transmits synaptic events in parallel to multiple neurons.

FIG. 1 shows a diagram of an example tile circuit 10 having a crossbar 12 in accordance with an embodiment of the invention. In one example, the overall circuit may comprise an "ultra-dense crossbar array" that may have a pitch in the range of about 0.1 nm to 10 µm. The neuromorphic and synaptronic circuit 10 includes said crossbar 12 interconnecting a plurality of digital neurons 11 comprising neurons 14, 16, 18 and 20. These neurons 11 are also referred to herein as "electronic neurons". For illustration purposes, the example circuit 10 provides symmetric connections between the two pairs of neurons (e.g., N1 and N3). However, embodiments of the invention are not only useful with such symmetric connection of neurons, but also useful with asymmetric connection of neurons (neurons N1 and N3 need not be connected with the same connection). The cross-bar in a tile accommodates the appropriate ratio of synapses to neurons, and, hence, need not be square.

In the example circuit 10, the neurons 11 are connected to the crossbar 12 via dendrite paths/wires (dendrites) 13 such as dendrites 26 and 28. Neurons 11 are also connected to the crossbar 12 via axon paths/wires (axons) 15 such as axons 34 and 36. Neurons 14 and 16 are dendritic neurons and neurons 18 and 20 are axonal neurons connected with axons 13. Specifically, neurons 14 and 16 are shown with outputs 22 and 24 connected to dendrites (e.g., bitlines) 26 and 28, respectively. Axonal neurons 18 and 20 are shown with outputs 30 and 32 connected to axons (e.g., wordlines or access lines) 34 and 36, respectively.

When any of the neurons 14, 16, 18 and 20 fire, they will send a pulse out to their axonal and to their dendritic connections. Each synapse provides contact between an axon of a neuron and a dendrite on another neuron and with respect to the synapse, the two neurons are respectively called pre-synaptic and post-synaptic.

Each connection between dendrites 26, 28 and axons 34, 36 are made through a digital synapse device 31 (synapse). The junctions where the synapse devices are located may be referred to herein as "cross-point junctions". In general, in accordance with an embodiment of the invention, neurons 14 and 16 will "fire" (transmit a pulse) in response to the inputs they receive from axonal input connections (not shown) exceeding a threshold. Neurons 18 and 20 will "fire" (transmit a pulse) in response to the inputs they receive from external input connections (not shown), typically from other neurons, exceeding a threshold. In one embodiment, when neurons 14 and 16 fire they maintain a postsynaptic-STDP (post-STDP) variable that decays. For example, in one embodiment, the decay period may be 50 ms. The post-STDP variable is used to achieve STDP by encoding the time since the last firing of the associated neuron. Such STDP is used to control long-term potentiation or "potentiation", which in this context is defined as increasing synaptic conductance. When neurons 18, 20 fire they maintain a pre-STDP (presynaptic-STDP) variable that decays in a similar fashion as that of neurons 14 and 16.

Pre-STDP and post-STDP variables may decay according to exponential, linear, polynomial, or quadratic functions, for example. In another embodiment of the invention, the variables may increase instead of decreasing over time. In any event, this variable may be used to achieve STDP by encoding the time since the last firing of the associated neuron. STDP is used to control long-term depression or "depression", which in this context is defined as decreasing synaptic conductance. Note that the roles of pre-STDP and post-STDP variables can be reversed with pre-STDP implementing potentiation and post-STDP implementing depression.

An external two-way communication environment may supply sensory inputs and consume motor outputs. Digital neurons 11 implemented using CMOS logic gates receive spike inputs and integrate them. In one embodiment, the neurons 11 include comparator circuits that generate spikes when the integrated input exceeds a threshold. In one embodiment, binary synapses are implemented using transposable 1-bit static random-access memory (SRAM) cells, wherein each neuron 11 can be an excitatory or inhibitory neuron (or both). Each learning rule on each neuron axon and dendrite are reconfigurable as described hereinbelow. This assumes a transposable access to the crossbar memory array. Neurons that spike are selected one at a time sending spike events to corresponding axons, where axons could reside on the core or somewhere else in a larger system with many cores.

Figure 2:
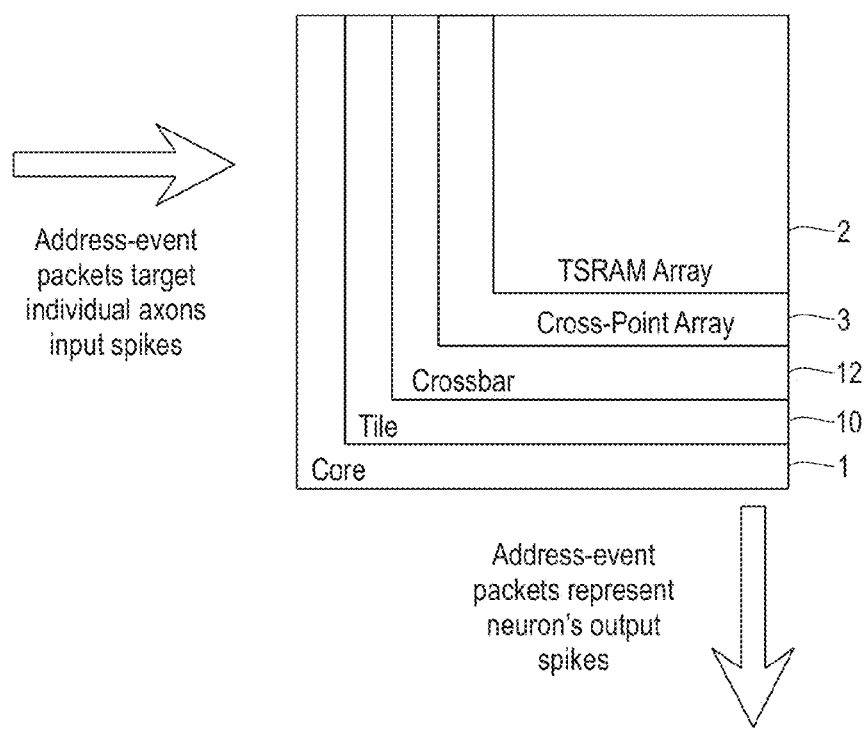
FIG. 2 shows a diagram of a neuromorphic and synaptronic event driven core circuit comprising a crossbar of electronic synapses interconnecting electronic neurons, in accordance with an embodiment of the invention.

FIG. 2 shows a hierarchical block diagram of a core circuit 1 including an example of said tile circuit 10, according to an embodiment of the invention. The core circuit 1 includes a transposable SRAM (TRSAM) array 2 of a set of synapses 31. The core circuit 1 includes a cross-point array 3 comprising sense amplifier and driver devices 7 (FIG. 6) for the tile circuit 10. Each synapse stores a bit that can be read, set, or reset from a row (axon) or column (dendrite) in the crossbar 12. Sense amplifier devices amplify signal when an SRAM synapse is being read (e.g., decide if synapse bit true or bit false). Driver devices 7 write the SRAM synapses when instructed such as for updating synaptic weights.

The sense amplifier devices feed into excitatory neurons which in turn connect into axon driver devices and dendrite driver devices. A sense amplifier translates synapse current levels to binary digital signals for integration by connected neurons.

The dendrites have driver devices on one side of the crossbar array and sense amplifiers on the other side of the crossbar array. The axons have driver devices on one side of the crossbar array.

Generally, an excitatory spiking electronic neuron makes its target neurons more likely to fire. Further, an inhibitory spiking electronic neuron makes its targets less likely to fire. Generally, such neurons comprise a single or multi-bit state (membrane potential) that increases when inputs from source excitatory neurons are received, and decreases when inputs from source inhibitory neurons are received. The amount of the increase or decrease is dependent on the strength of the connection from a source neuron to a target neuron.

Figure 3:
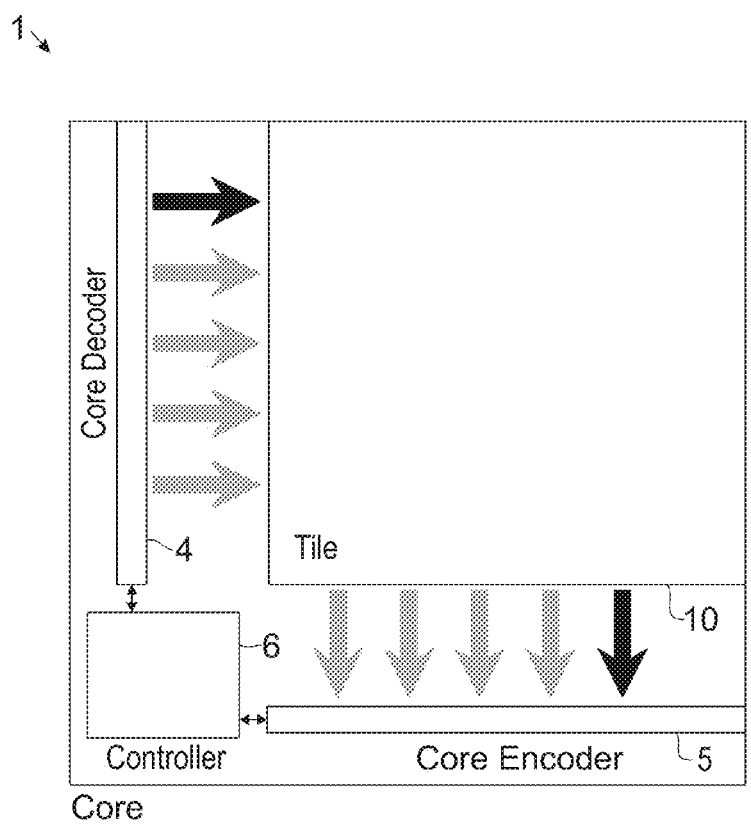
FIG. 3 shows a diagram of details of the core circuit of FIG. 2, in accordance with an embodiment of the invention.

FIG. 3 shows further details of a core 1. As shown in FIG. 3, the core 1 further includes a decoder 4 (address-event receiver), an encoder 5 (address-event transmitter), and a controller 6, according to an embodiment of the invention. The address-event receiver/decoder 4 receives spike events (packets) and transmits them to selected axons. The address-event transmitter/encoder 5 transmits spike events (packets) corresponding to any neuron 11 that spiked. The controller 6 sequences event activity within a timestep. The tile circuit 10 includes axon and neuron circuits which interface with said decoder 4 and encoder 5, respectively.

The tile circuit 10 receives and transmits events as one-hot codes: one axon at a time, one neuron at a time. The core 1 decodes address events into a one-hot code, in which one axon at a time is driven. The core 1 encodes the spiking of neurons (one at a time), in the form of a one-hot code, into an address event. From 0 to all axons can be stimulated in a timestep, but each one axon only receives one event in one timestep. Further, from 0 to all neurons can spike in one timestep, but each neuron spikes once in a timestep. As such, each axon receives events from a single neuron, otherwise, two neurons may fire in the same timestep. Further, a neuron may drive several different axons. As such, in one embodiment, the number of axons can exceed the number of neurons. In another embodiment, the number of neurons and axons can be equal or there can be more neurons than axons.

Axons buffer incoming spikes then drive the crossbar 12 to drive neurons. Neurons add (and subtract) from membrane potential when events arrive (from axons via synapses). Pre-synaptic neurons perform STDP, keep track of when last pre-synaptic event (axon) occurred and inform post-synaptic neurons when a pre-synaptic event occurs (read event). If a post-synaptic event (neuron) occurs, after the pre-synaptic event a decision is made to potentiate (e.g., using the pre-SDTP variable).

Post-synaptic neurons perform STDP, keep track of when last post-synaptic event (neuron) occurred and inform pre-synaptic neurons when a post-synaptic event occurs (neuron event). If pre-synaptic event (axon) occurs, after the post-synaptic event a decision is made to depress (e.g., using the post-STDP variable).

Figure 4:
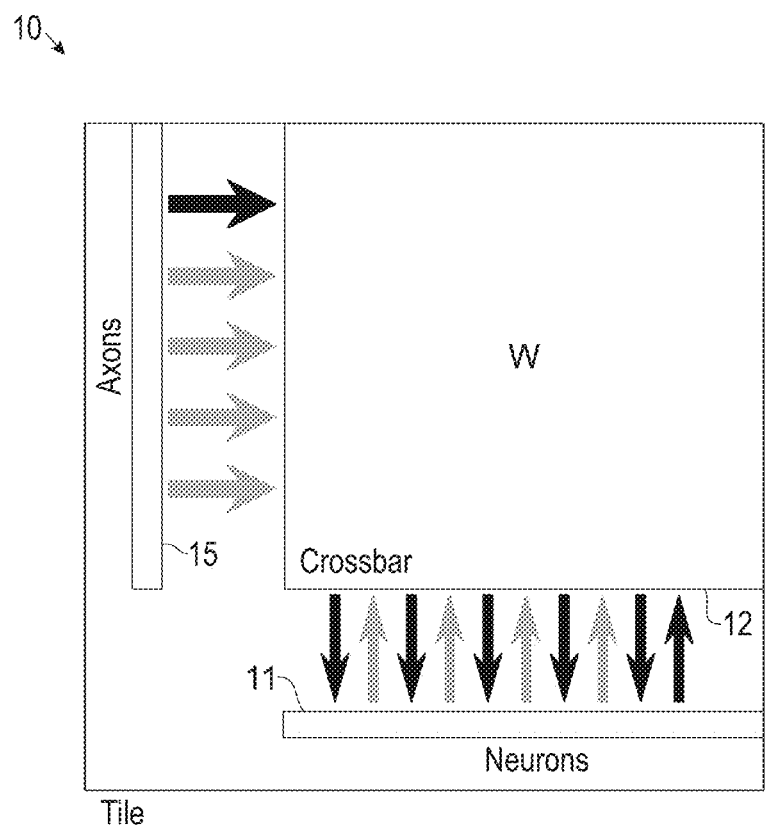
FIG. 4 shows a diagram of details of a tile circuit of the core circuit of FIG. 3, in accordance with an embodiment of the invention.

FIG. 4 shows further details of a tile circuit 10. Neurons 11 spike one at a time, driving the crossbar 12 via the axons 15, such that one axon at a time drives the crossbar 12. When the crossbar 12 receives an axon event, the crossbar 12 drives all neurons in parallel. As such, the crossbar 12 receives events as one-hot codes from both axons and neurons, but the crossbar 12 transmits in parallel to neurons.

The synapses 31 in the crossbar 12 communicate events between the axons and the neurons. A learning rule such as STDP is applied in the neural network to update synaptic weights of the synapses 31 therein via interface modules such as the driver devices 7 in FIG. 6. The learned weights are then used in the spiking neuron. According to an embodiment of the invention, STDP is performed with order (n), or O(n), circuits (for n presynaptic and n postsynaptic driver devices) for n*n synapses, wherein "*" indicates multiplication. In another embodiment, STDP is event driven rather than continuously computed. If no spikes occur, no synapses are evaluated for update. One core (e.g., a tile 10) provides and tightly integrates computation (via neurons), communication (via spikes in and out and synaptic fan out), and memory (via synaptic crossbar and neuron state), forming a repeatable architectural element.

In one embodiment, the synapses 31 are binary memory devices, wherein each synapse can have a weight "0" indicating it is non-conducting, or a weight "1" indicating it is conducting. A horizontal update (axonal synapse update in crossbar 12) is for updating (setting/resetting) weights of synapses in a row of the crossbar 12, and a vertical update (dendritic synapse update in crossbar 12) is for updating (setting/resetting) weights of synapses in a column of the crossbar 12.

Based on a neuron spike, an axon 15 sends an event into the crossbar 12, wherein the weight matrix W is read and events are selectively sent out based on the synaptic weights, driving the neurons 11 to which the selected axon 15 connects. In one example, the crossbar 12 also communicates events symmetrically from the neurons 11 to the axons 15, wherein when a neuron sends an event into the crossbar 12, the crossbar 12 reads the weight matrix W and sends out events to all of the axons that are connected to the selected neurons. This symmetrical communication corresponds to a transposable weight matrix.

According to an embodiment of the invention, the transposable weight matrix provides the crossbar 12 with the information required to perform STDP. In STDP, potentiation (weight increase) occurs when an axon (or pre-synaptic) event arrives before a neuron (or post-synaptic) event. Depression (weight decrease) occurs when a pre-synaptic event arrives after a post-synaptic event. To realize potentiation, when a pre-synaptic event arrives, the core 1 records its arrival time, and when a subsequent post-synaptic event arrives, the core 1 calculates the time difference between the events. If the difference is within a desired STDP window, the core 1 can potentiate (or depress for anti-STDP) the synapse. Several implementations are possible, wherein in one implementation the synapses are updated probabilistically (e.g., using a pseudorandom number generator to decide to change the weight from 0 to 1 (or 1 to 0) depending on the time difference). By using stochasticity, an integrator is not required for each synapse and yet a synapse is unlikely to switch with a single pre-post event (or post-pre event) pairing, providing noise immunity.

In a symmetric manner, to realize depression, when a post-synaptic event arrives, the core 1 records its arrival time, and when a subsequent pre-synaptic event arrives, the core 1 calculates the time difference between the events. If the difference is within the STDP window, the core 1 can depress (or potentiate).

As such, the core 1 implements STDP on its weight matrix W. Synapse potentiation may occur when a pre-synaptic (axon i) event precedes a post-synaptic (neuron j) event. The synapse connection between axon and neuron is probabilistically potentiated (SRAM set, Wij[t]=>1) wherein probability decreases for increasing time difference between post and pre events. Depression is symmetric and may occur when a post-synaptic (neuron j) event precedes a pre-synaptic (axon i) event. The synapse connection between axon and neuron is probabilistically depressed (SRAM reset, Wij[t]=>0) wherein probability decreases for increasing the time difference between pre and post events. As described in more detail further below, an axon selector enables one axon at a time to drive the crossbar 12. Similarly, only one neuron at a time may drive the crossbar 12. As such, the core 1 is a spike processor: spikes in, spikes out.

Figure 5:
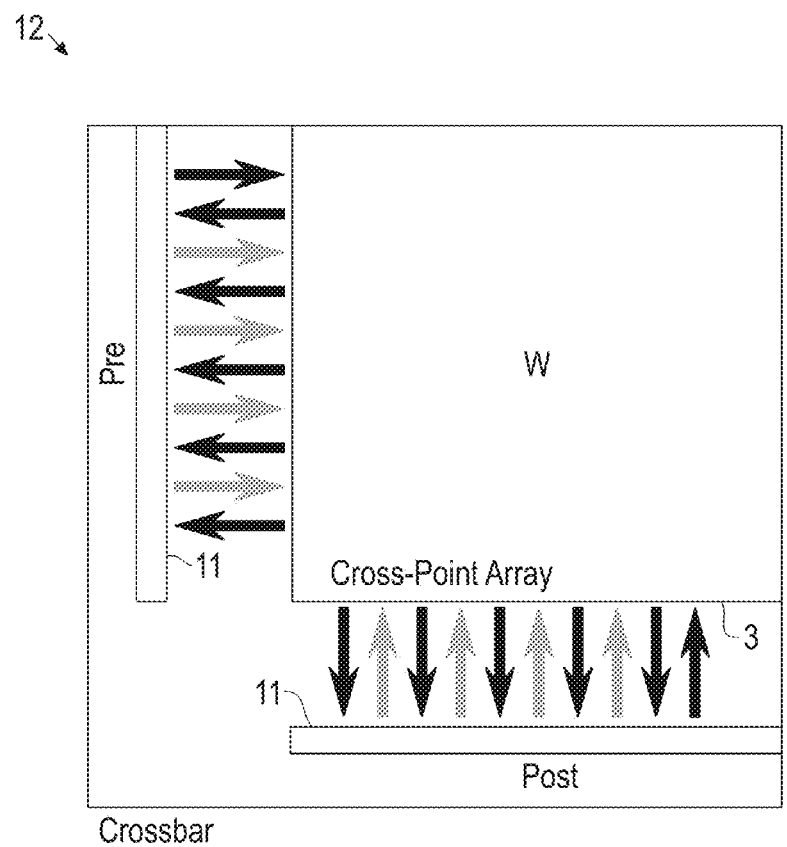
FIG. 5 shows a diagram of details of a crossbar of the tile circuit of FIG. 4, in accordance with an embodiment of the invention.

The synaptic weights can be represented as a matrix W corresponding to the synapses 31. FIG. 5 shows the synaptic weight matrix state to pre-synaptic (Pre) neurons and post-synaptic (Post) neurons 11, wherein the matrix W is set and reset by said neurons 11. One pre-synaptic neuron at a time drives the crossbar 12 during an axonal read event for a connected synapse. Multiple pre-synaptic circuits can drive the crossbar 12 during an axonal write (set) event for a connected synapse. One post-synaptic neuron at a time drives the crossbar 12 during a neuron read event for a connected synapse. Many post-synaptic circuits can drive the crossbar 12 during a synapse write (reset) event for a connected synapse.

The cross-point array 3 communicates its state to the pre-synaptic circuits and to post-synaptic circuits and is driven by them. In one embodiment, a pre-synaptic circuit realizes the pre-STDP variable, such that when an axon receives an event and fires, the pre-STDP variable is set to a programmable positive value, and decays by a programmable step down each subsequent time-step. If a post-synaptic event (neuron spike) occurs while the pre-STDP variable is greater than 0, the synapse strength (or bit) increases (or is set to 1) with a probability related to the pre-STDP value.

In one embodiment, a post-synaptic circuit realizes the post-STDP variable such that when a neuron integrates and fires, the post-STDP variable is set to a programmable positive value, and decays by a programmable step down each subsequent time-step. If a pre-synaptic event (axon spike) occurs while the post-STDP variable is greater than 0, the synapse strength (or bit) decreases (or is set to 0) with a probability related to the post-STDP value.

According to embodiments of the invention, depression (reset) can occur when a pre-synaptic event precedes a post-synaptic event. Depression occurs when an axon event drives a pre-synaptic circuit, which drives the cross-point array 3. In response, the cross-point array 3 drives all of the post-synaptic circuits in parallel. Each post-synaptic circuit keeps track of the last time its associated neuron spiked. When the cross-point array 3 drives the post-synaptic circuit, the post-synaptic circuit draws a random number related to how long ago the neuron spiked (further back in time corresponds to lower probability). If the post-synaptic circuit draws a 1, then the post-synaptic circuit has selected to depress the synapse element in the cross-point array that is driving it, such that the post-synaptic circuit sends a depress signal in the cross-point array.

Potentiation (set) is symmetric with depression, and can occur when a post-synaptic event precedes a pre-synaptic event. Potentiation occurs when a neuron spike event drives the post-synaptic circuit, which drives the cross-point array. In response, the cross-point array drives all of the pre-synaptic circuits in parallel. Each pre-synaptic circuit keeps track of the last time its associated axon received an event. When the cross-point array drives the pre-synaptic circuit, the pre-synaptic circuit draws a random number related to how long ago the axon transmitted a spike (further back in time corresponds to lower probability). Axons receive input from other neurons in the system and transmit that input to the crossbar. If the pre-synaptic circuit draws a 1, then the pre-synaptic circuit has selected to potentiate the synapse element in the cross-point array that is driving it, such that the pre-synaptic circuit sends a potentiate signal in the cross-point array.

Figure 6:
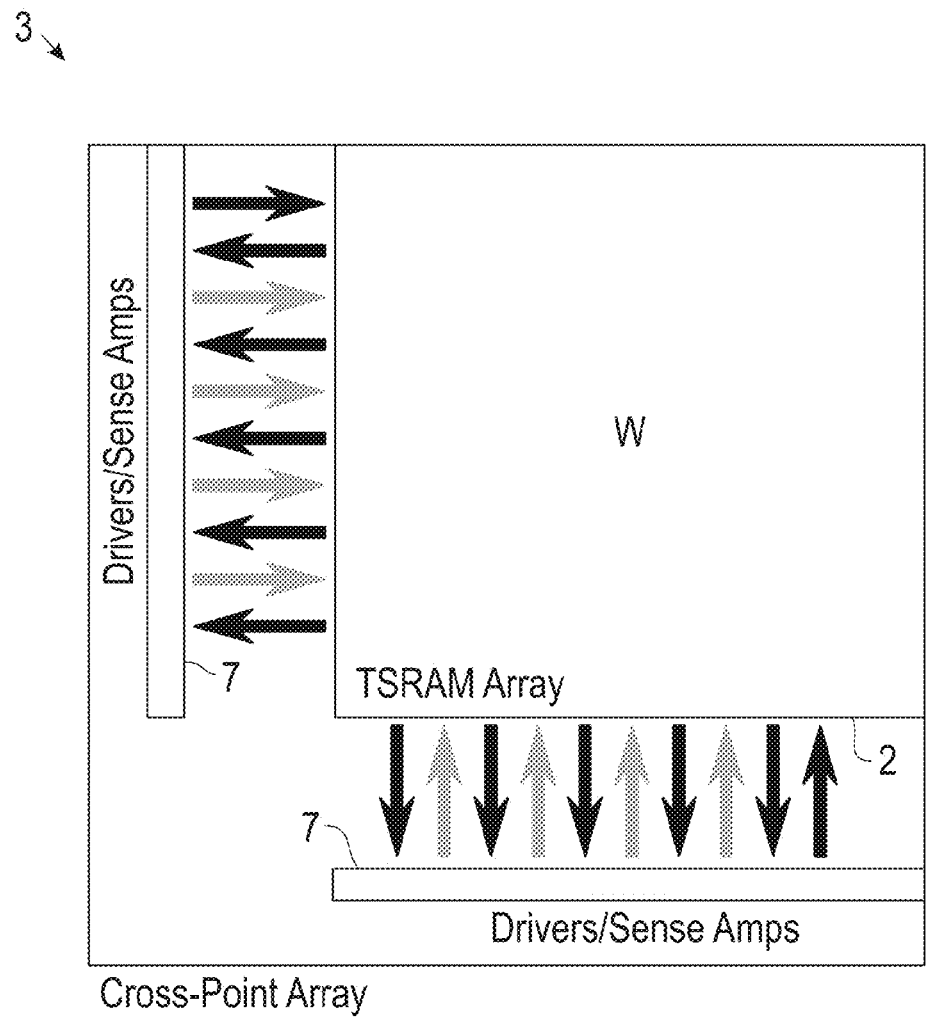
FIG. 6 shows a diagram of details of a synapse cross-point array of the crossbar of FIG. 5, in accordance with an embodiment of the invention.

FIG. 6 shows further details of a cross-point array 3 of FIG. 2. The TSRAM array 2 of the synapses is represented by the matrix W wherein words and bit lines can be read/written in a column or row manner. The TSRAM array 2 comprises transposable 8 transistor SRAM cells wherein both rows and columns send word lines and bit lines. Each transistor SRAM cell implements a synapse. As such, a row can be read or written, or a column can be read or written. The TSRAM array 2 can be replaced by an array of any transposable read/write memory devices such as an array of phase change memory (PCM) or magnetic tunnel junction (MTJ).

Figure 7:
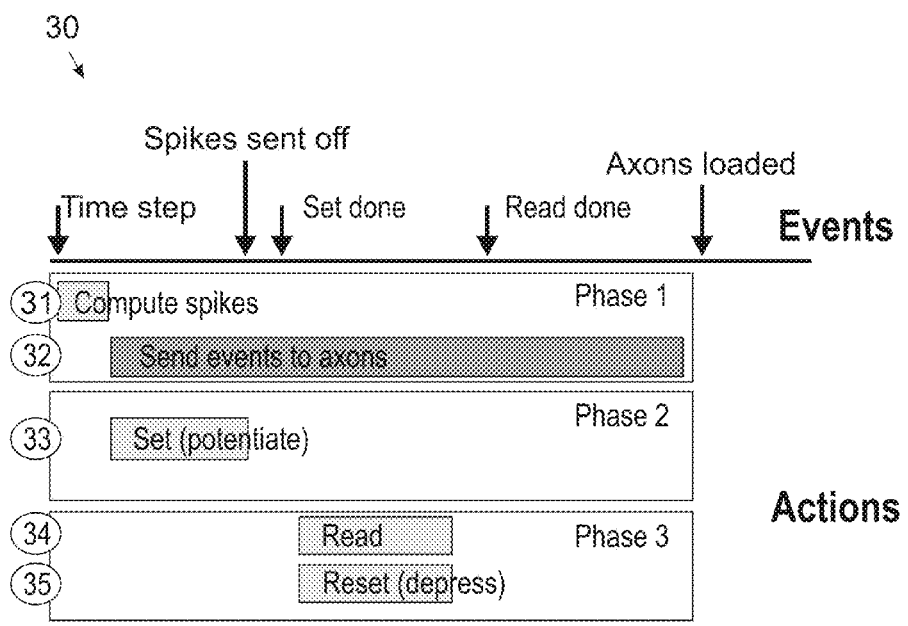
FIG. 7 shows an event driven process in operation of the core circuit of FIG. 2, in accordance with an embodiment of the invention.

FIG. 7 illustrates a process 30 comprising a time sequence of events and functions/actions of a core 1, according to an embodiment of the invention. In each timestep, process blocks 31-35 function as follows:

Process block 31: Neurons compute whether or not they spike by integrating inputs thereto. This action is serial with other actions (Phase 1).

Process block 32: Following the spike computation, neurons send out spikes (into an address event router such as a spike router). Spikes arrive at their target axons and are held there (the axons will drive the neurons in two timesteps). Preferably, this action occurs immediately after spike computation because routing spikes throughout the core 1 to their targets is likely the critical path in setting network performance (Phase 1).

While spikes are sent throughout the core 1, process blocks 33-35 function as:

Process block 33: Each post-synaptic circuit (whose associated neuron spiked) performs the potentiation (set) computation by interacting with all post-synaptic circuits in parallel.

Process block 34: All of the synapse read operations take place sequentially (axons drive buffered spike event from two timesteps ago (t−2)). When each read operation occurs all neurons update their membrane potentials in parallel (this is pipelined such that the next read can start while this computation takes place).

Process block 35: At the same time as the read operation, the post-synaptic circuit performs the depression (reset) computation.

Timesteps are based on a hardware clock generated clock cycles. Process 30 breaks up a timestep into macro segments. In another embodiment, each event drives a sequence of its own: (1) an axon event initiates a read operation and a reset operation, and (2) a neuron event initiates a transmit operation and a set operation.

Neurons can perform their spike computation at the start of a timestep or they can perform it continuously, spiking whenever their input drives them above a threshold. An axon requires buffering using a buffering circuit (such as memory), such that it can hold events from two timesteps. This allows the computation and communication to run in parallel, improving performance. Slowing down the computation (by lowering the voltage supply) to match the speed of the communication, power consumption in each core 1 can be reduced.

Computation and communication may be implemented in parallel using axon circuits that provide buffering for two events. During each cycle of the clock, each axon buffers events it receives from any neurons that spiked in timestep t (max of one) in a buffer0. When the clock arrives (step t+1), each axon shifts any events it has to a buffer1. When the next clock signal arrives, all events in buffer1 are (sequentially) sent into the crossbar 12 and therefore into the neuron circuits, which compute spikes for timestep t+2.

Figure 8:
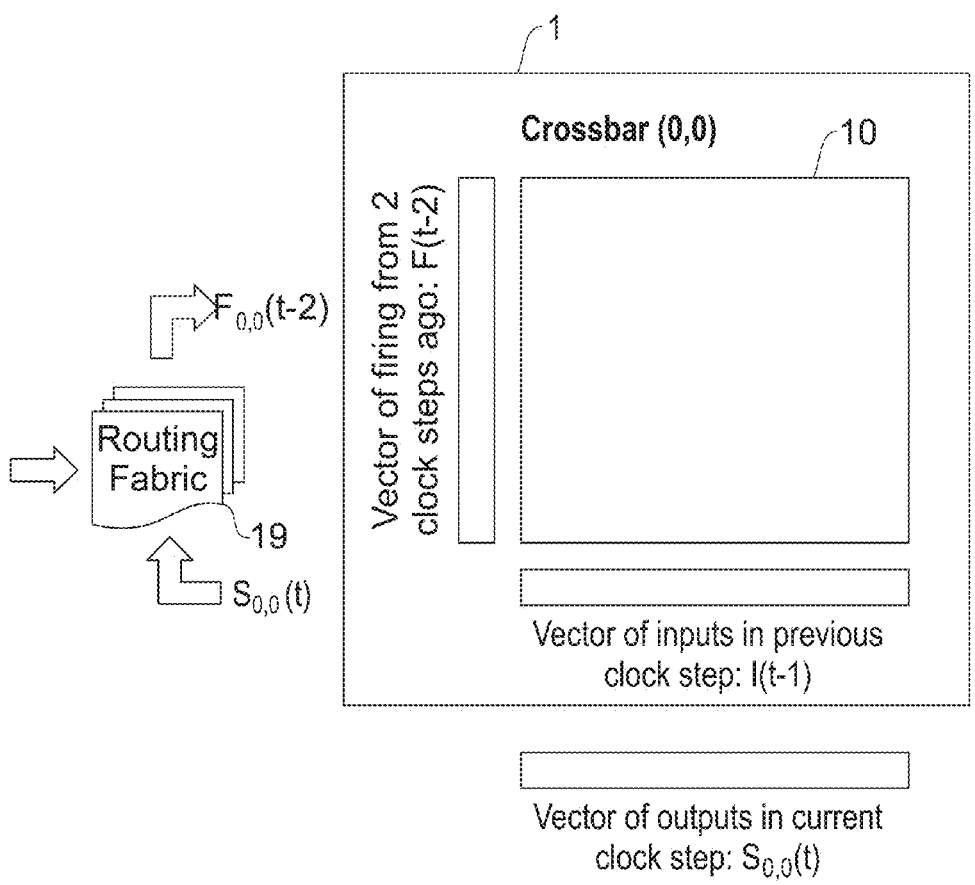
FIG. 8 shows a diagram of the core circuit of FIG. 2 in relation to a routing fabric, in accordance with an embodiment of the invention.

FIG. 8 shows a block diagram of a core 1 and event handling, according to an embodiment of the invention. The core 1 is connected to other circuits such as neural networks comprising other cores 1, using a routing fabric or network 19. F is a binary vector of length A, wherein A represents the number of axons. I is a binary vector of length A, and $S_{x,y}$ is an input from another (or the same) core or tile in the network (from a location x, y in relation to the crossbar). The time (t) is in reference to a frame of spike events being generated (the neuron frame of reference). Vector of firing from 2 clock steps ago is F(t−2), and vector of inputs in previous clock step is I(t−1). Neurons in the core 1 compute their spikes at time t, based on the inputs from t−1 (i.e., I(t−1)). With events entering the routing fabric 19 as spikes, the events are considered to occur at time t. When the events leave the routing fabric as pre-synaptic events, however, they are considered to be two timesteps behind. This does not imply that the routing takes two timesteps. The spike router may deliver events within a timestep.

Figure 9:
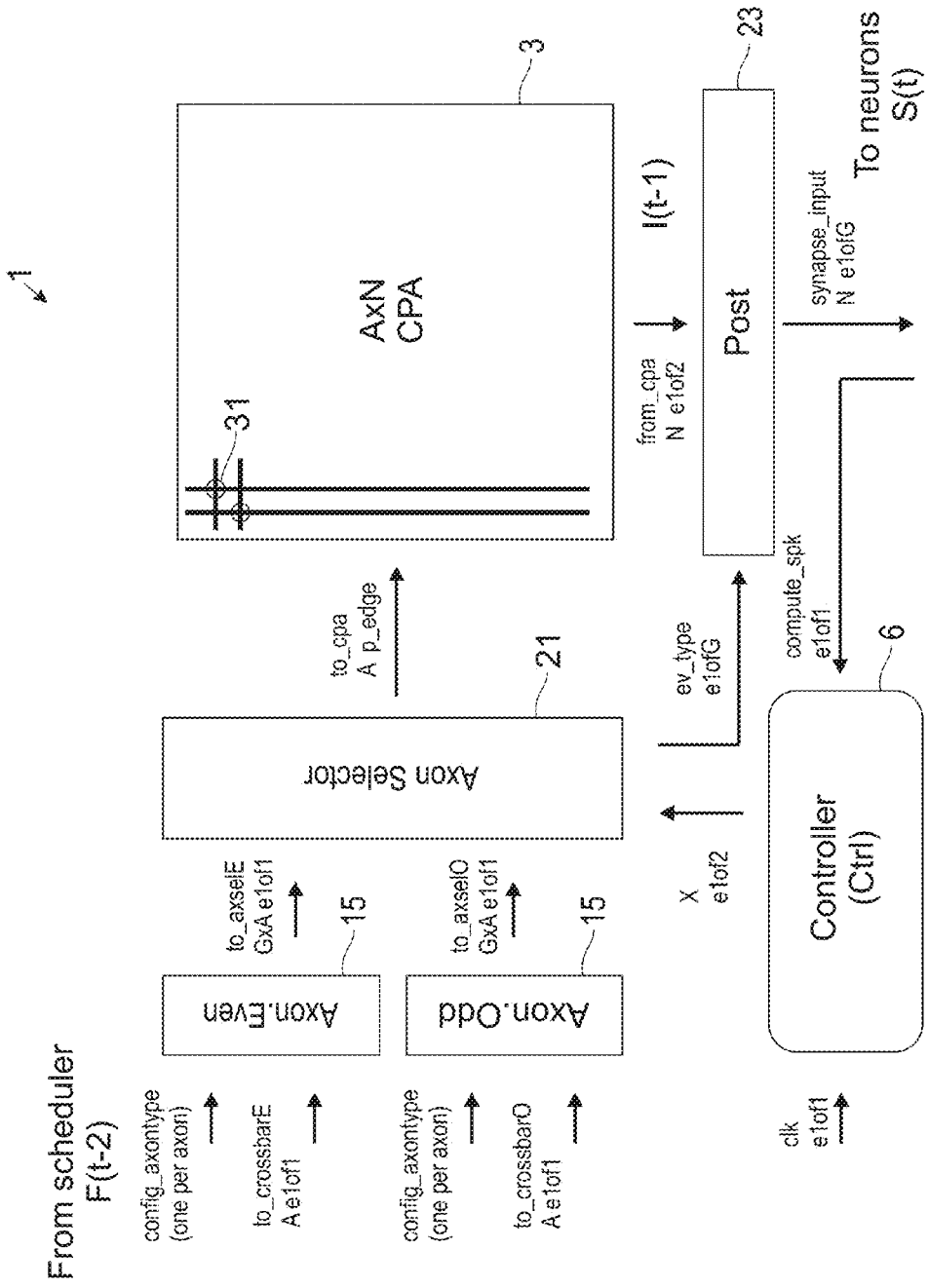
FIG. 9 shows a diagram of further details of the core circuit of FIG. 8, including axon banks and an axon selector, in accordance with an embodiment of the invention.
Figure 10:
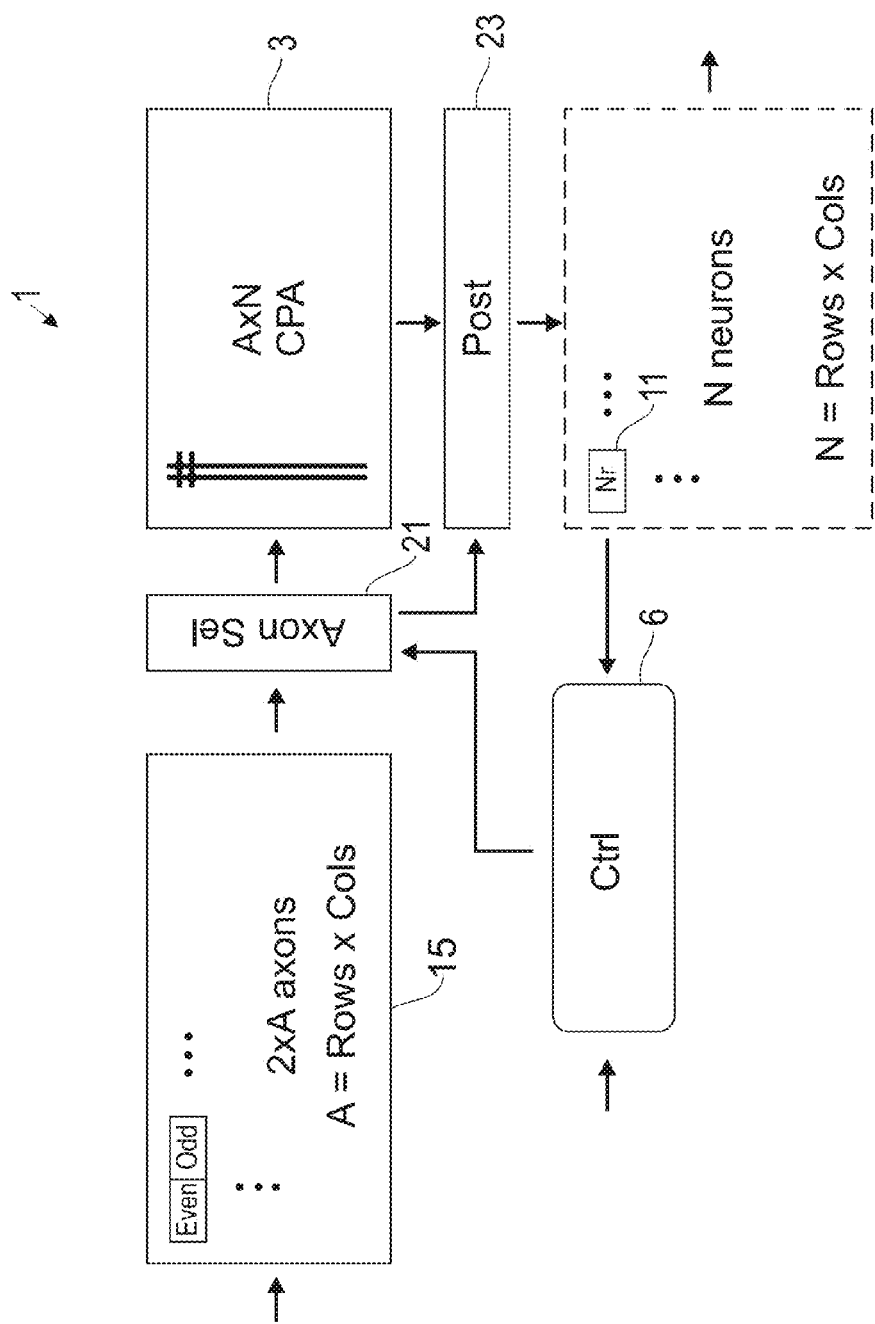
FIG. 10 shows a diagram of further details of the core circuit of FIG. 8, including axon banks, a neuron array and a synapse cross-point array (CPA), in accordance with an embodiment of the invention.
Figure 11:
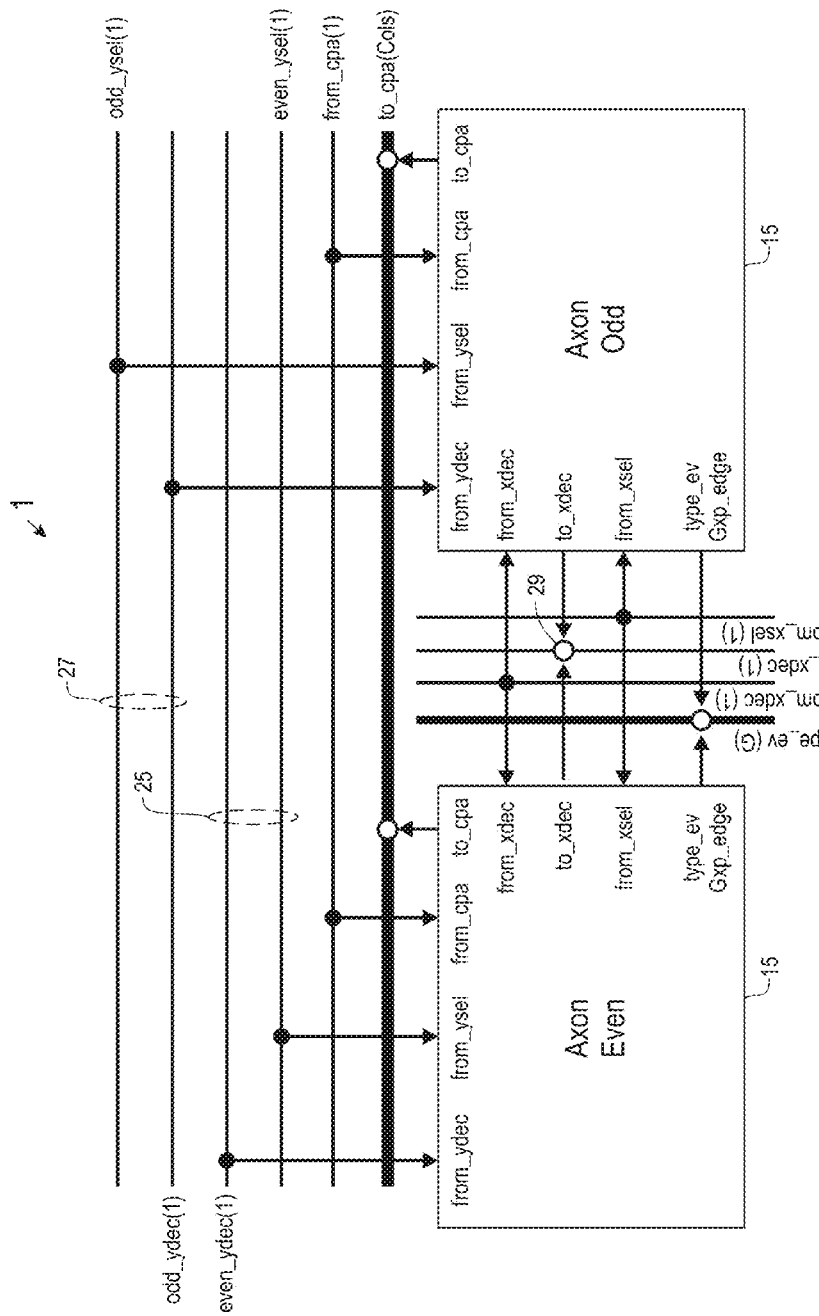
FIG. 11 shows a diagram of axon banks and event signal routing of the core circuit of FIG. 8, in accordance with an embodiment of the invention.

FIG. 9 shows further details of a core 1 and corresponding crossbar function, according to an embodiment of the invention. FIG. 10 shows further details of the core 1 and corresponding crossbar function in conjunction with FIG. 9. FIG. 11 shows further details of the core 1 and axon function in conjunction with FIGS. 13 and 14. Now referring to FIGS. 8-11, the CPA 3 is represented by an A×N matrix of synapses 31, wherein N represents the number of neurons. In a timestep, the controller 6 updates its internal state X_internal as X:=FlipParity(X), which is a flip from even to odd and visa-versa. Upon a compute_spk signal, indicating it is acceptable to send events to neurons from the CPA 3, axon.X events are sent along with type info, one at a time, to the CPA 3. In parallel, axon.FlipParity(X) is loaded with incoming events.

As such, on a new timestep, the controller 6 updates its internal state by flipping (i.e., toggling) a variable X_internal. In parallel, the neurons (neuron array) are computing all of their spikes (not shown). Once all the spikes have been computed the controller receives said compute_spk signal. Based on the value of X_internal (even or odd), the controller 6 activates its X port which directs an axon selector 21 to select an appropriate axon bank 15 (Axon.Even or Axon.Odd). The controller 6 acknowledges the timestep (clk) after the axon selector 21 has completed selection, and the neurons have all sent out their spikes (compute_spk clears).

When the axon selector 21 receives a token on X (even or odd), the axon selector 21 selects through the appropriate axon bank, and loops through one axon at a time. For each stored axon event, the axon selector 21 sends that event through the CPA 3 as well as informs a post circuit 23 as to what type of event it should process (ev_type), clearing each event in the selected axon bank in succession. When complete, the axon selector 21 surrenders control back to the controller 6. Note that information, including axon type, may also be provided directly from the CPA 3.

The post circuit 23 services all pending CPA events, as well as the event type, by delivering them to the appropriate neuron port (excite, inhibit, etc.). The post circuit 23 may include a function to inform the axon selector 21 when it is acceptable to clear both the CPA and event type.

In parallel to the above, a scheduler delivers events one at a time (arriving from the routing fabric 19 in FIG. 8) into the axon bank that is not selected (i.e., empty axon bank) Both the scheduler and controller 6 keep track of even and odd phases, computed once.

Figure 12:
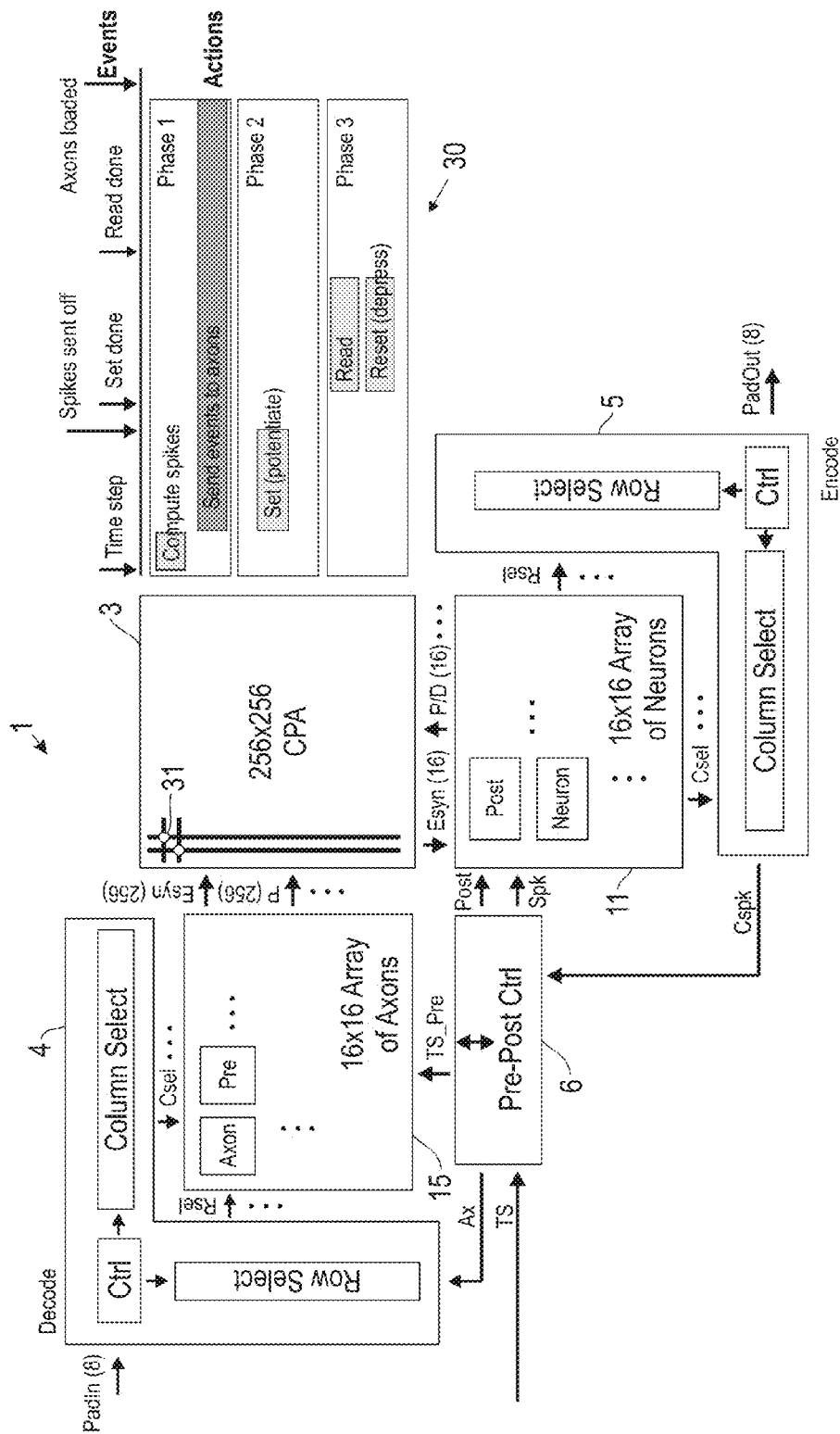
FIG. 12 shows a detailed diagram of event signaling and operation process of the core circuit of FIG. 8, in accordance with an embodiment of the invention.

FIG. 11 represents a horizontal and vertical slice through the axon array. All signals are single rail (p_edge). Signal lines 25 indicate even-specific signals, signals lines 27 represent odd-specific signals. The elements 29 represent logical OR, or wired OR. Solid circles represent connections between wires. FIG. 12 shows further details of the core 1 and a process in conjunction with FIGS. 11-13, according to an embodiment of the invention. When a spike event arrives at the decoder/scheduler, it is decoded and sent to the axon array. Within the axon array, a spike is either decoded to a selected even or odd axon block, alternating between timesteps. The scheduler is responsible for activating {even, odd}_ydec and from_xdec (shared line), at which point the selected axon block will latch the event and acknowledge through to_xdec, with a symmetric clearing phase. On a timestep, the axon selector 21 loops through either all the even or odd axon rows. Specifically, the axon selector 21 probes a row by activating {even,odd}_ysel. All axon blocks in that row send a 1 of G code that specifies: if they have a stored event, and the type of axon (e.g., excitatory, inhibitory, etc.). This code is sent in the column direction. When an axon block is selected (from_xsel), it will then activate its to_cpa signal line if it has an event queued. After collecting acknowledgments (acks) from the CPA 3 (via from_cpa) and the column selector (from_xsel), the axon selector 21 will then reset its state.

The above architecture maintains one-to-one correspondence between hardware and software. As such, a hardware model and a software model are in one-to-one correspondence, for both the learning and non-learning designs.

Embodiments of the invention further provide a neural network comprising a plurality of interconnected core circuits, each core circuit comprising an electronic synapse array comprising multiple digital synapses interconnecting a plurality of digital electronic neurons, a synapse interconnecting an axon of a pre-synaptic neuron with a dendrite of a post-synaptic neuron, wherein a neuron integrates input spikes and generates a spike event in response to the integrated input spikes exceeding a potentiation threshold. The neural network further includes a scheduler that receives a spike event and delivers the spike event to a selected axon in the synapse array based on a schedule for deterministic event delivery. The scheduler delivers the spike event to a selected axon in the synapse array after a delay period. In one embodiment, the delay period is based on a timestamp indicating generation of the spike event and a predetermined delay threshold for event delivery.

In one embodiment, the scheduler selectively imposes a delay on delivery of the received spike events for deterministic event delivery. The events are delivered with the same propagation period from event generation. In one embodiment, the neural network further includes an intra-circuit event router wherein each core circuit further comprises an intra-circuit event router for one or more core circuits, wherein the intra-circuit event router routes events from a spiking neuron to a destination axon in the synapse array. The neural network further includes an event routing system interconnecting the core circuits. The event routing system comprises a plurality of inter-circuit event routers that route events between core circuits.

Figure 13:
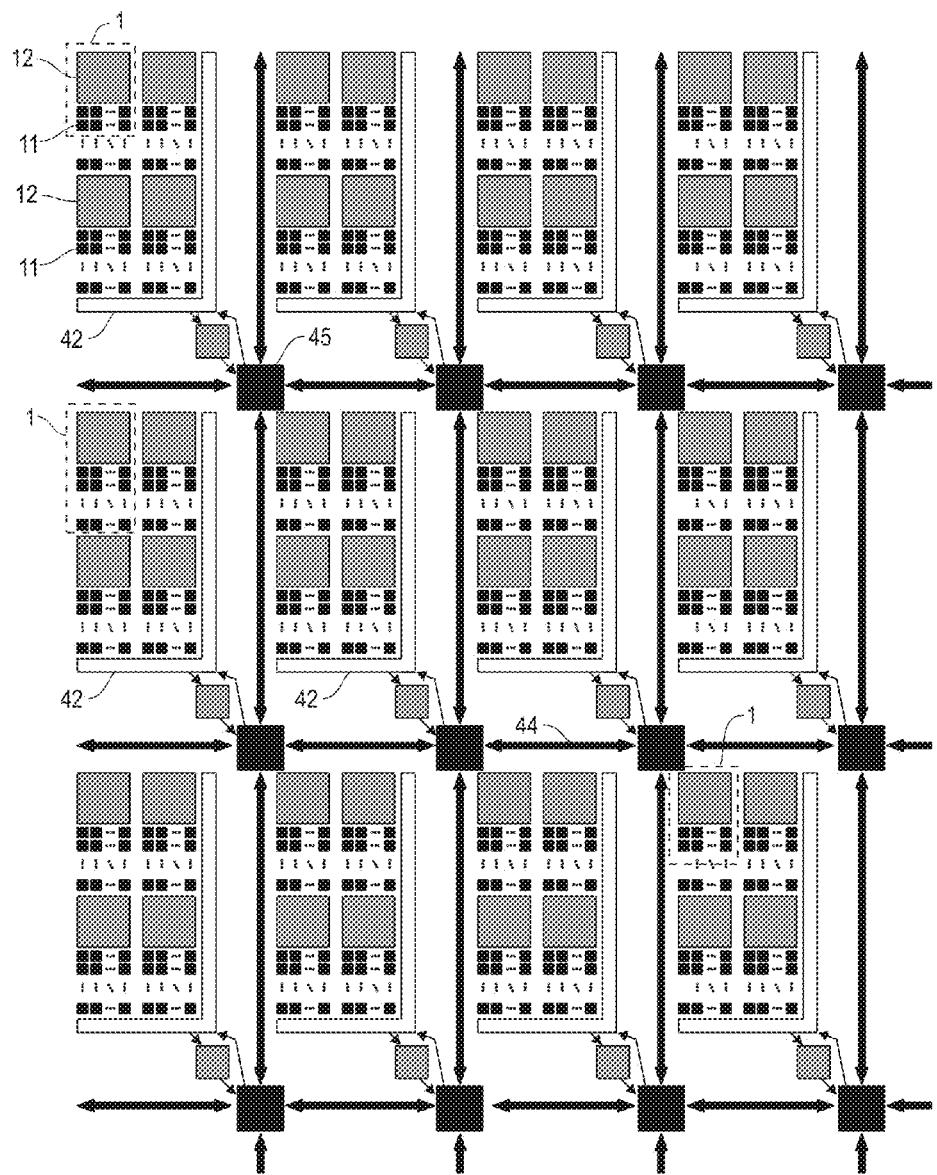
FIG. 13 shows a diagram of a neural network comprising multiple interconnected core circuits, in accordance with an embodiment of the invention.

FIG. 13 shows a neuromorphic network 40 comprising multiple interconnected cores 1 in a scalable low power network, according to an embodiment of the invention. The network 40 may be implemented as a circuit chip. In the event-driven network 40 active power is only consumed when there are spiking events to be processed, wherein an event corresponds to spiking activity or update state variables in the network 40. Examples of the state variables include the states of individual neurons and synaptic weights.

An address event router (AER) system 42, such as a spike router, converts spikes generated by the neurons into addresses. A routing table converts source neuron addresses into a list of destination axons where the spikes are delivered. A routing fabric 44 delivers spikes to the appropriate destination using interchip routers 45.

Further, a spike delivery system including a scheduler ensures that a spike arriving from the routing fabric is delivered to the appropriate axon at the appropriate time so as to model axonal delays. This provides one-to-one correspondence between software simulation and circuit chip implementation. In one example, axonal delay is assumed to be about 1 ms. AER circuits may be amortized over a larger number of neurons as necessary.

In one embodiment of the invention, each crossbar 12 accepts events from a scheduler as they arrive. It requires that events in the network arrive within one clock period, and that each axon receives at most one input per timestep. One axon receives events from only one neuron (which can only spike once per timestep). One neuron, however, may send events to many axons (i.e., when number of axons>number of neurons). As noted, when the crossbar accepts events from the scheduler, the crossbar delivers the events to the targeted axons.

Each neuron takes one synaptic input, returns one bit specifying if there was a spike, and sends the AER system one spike output. Each neuron has its threshold, and time constant individually configured (neurons share other inputs). Outputs from the crossbar arrive together for a given axon, and are combined with a shared excitation/inhibition indicator bit. All synaptic inputs must complete before a spiking decision is made. The spike transmitted to the AER system and back to the crossbar is processed before the next spike is generated by the neuron (i.e., within one clock period).

In one embodiment, each neuron on each cycle of the clock accumulates the excitatory inputs from the crossbar, subtracts the inhibitory inputs from the crossbar, and performs a "leakage" operation, and then compares to a threshold and decides whether to spike or not. Spikes are communicated to the AER system by communicating first on the row, and then on the column (sequential operations). The neuron update is governed by an integrate-and-fire process.

In one embodiment, in a given clock cycle there can be multiple (n excite) excitatory or inhibitory (n_inhibit) spikes. These are all accumulated, and a spike is only generated at the next positive clock edge if a value V (local state variable such as neuron potential) exceeds a threshold. This is logically equivalent to the spike being generated at the end of the current clock period.

In one example, the value of V is maintained using a 10-bit signed representation. As such, all neuron spikes are in synchronous with a global clock used to track elapsed time, and one neuron can have at most one spike in each clock period. The spike information is also communicated back to the crossbar to update synaptic weights using STDP.

In one embodiment, the AER system converts spiking activity from individual neurons into a sequence of addresses that correspond to the neuron number that spiked. The AER system assumes that a neuron completes a two phase handshake with a row_request line before it initiates a handshake with a col-request line. The row request lines are assumed to have an open drain (i.e., a neuron pulls the line up when it has a spike, and releases the line once the handshake with the col_request line completes). Neurons handshake with the AER system through a row_request wire to indicate their row addresses. There are N row_request signals for a neuron array with N rows. Neurons handshake with the AER system using a col_request wire to indicate their column addresses. There are N col_request signals for a neuron array with N columns.

Each row and each column of a neuron array has it own serving modules that provide the neurons access to an output bus in a mutually exclusive basis. The output bits on the bus encode the neuron address where a spike occurred. The row serving modules and column serving modules have separate tokens that circulate among them. Every time the row token or column token moves, a counter is updated to keep track of the tokens.

At the onset of a spike, a neuron pulls its row_request line up. The corresponding row serving module acknowledges this event if it has the row token. If the serving module does not have the token, it communicates with its neighbors and waits for the token to circulate around before acknowledging the row request line. Upon acknowledgement from the row serving module, the neuron pulls up its column_request line. Once the corresponding column serving module has the column token, it completes the handshake with the neuron and signals a counter to send out the row and column counts to the output bus.

Implementing the AER system using a distributed mutual exclusion protocol allows it to handle both low and high spike rates efficiently. At high spike rates every token goes through a row arbitration process separately since neurons in the same row can initiate column communication as soon as their shared row serving module receives the token. At low spike rates tokens only go to the spiking rows and columns.

According to an embodiment of the invention, an address table includes routing information, and converts a source neuron address into a set of destination axon addresses. The value of timestamp does not change while the inputs are being processed. This is guaranteed if the table access is fast relative to the system clock frequency, and all outputs are processed quickly relative to the system clock frequency.

The address table is direct mapped and specifies the connectivity. It provides a mapping from the local neuron address to a set of corresponding destination addresses (if several) to which the spikes have to be delivered. The address table sends the corresponding spikes to a spike router (such as mesh router or a local spike delivery system if the address is in the same core).

Inputs are encoded versions of neurons spiking in a given core. Outputs represent a sequence of destination neurons formatted as packets in a router-access case. A stripped-down packet (same format as outputted by the mesh router) is used if the spike is sent to the same tile.

The timestamp embedded in the packets (both for local delivery and router delivery) contain the bottom 4 bits of the current time. Because of the synchrony requirements, this timestamp will not change during processing. A mesh router is used to provide deadlock-free routing of spikes from the output of the address table to their appropriate destination. The router uses simple dimension-order routing to deliver packets to their destinations.

In one implementation, packets use a 24-bit flit, and interface channels use 24-bits wide format including a 5-bit dx field, a 5-bit dy field, a 4-bit dt field and a 10-bit dest_addr field. This format allows for a 32×32 mesh router, with 4 bits of fine-grained axonal delay specification, and 1024 axons per array. The packet is in "Big Endian" format, with the least significant ten bits corresponding to the dest_addr field. The packet format is used for routing in the horizontal direction. For the vertical direction, the dx field is stripped off the packet. This leaves 19-bit wide packets that are routed in the vertical dimension.

The packet that is delivered to the final destination only has 14 bits, because the dx and dy fields are both stripped off. The dx and dy values are represented with 2's complement integers. The dt field is an unsigned integer, and dest_address is the address of the axon in the final array to which the spike is delivered. The router implements a bi-directional mesh router. The destination dx and dy addresses provide an offset in the X-coordinate and Y-coordinate of the array. Packets are routed first in the X-dimension, and then in the Y-dimension. The data from the router and local interface must satisfy packet format requirements. The handshake with the crossbar must complete in the clock period in which it has been initiated.

When the scheduler receives a packet (either from the router or from the local port), it decodes the packet to determine where the spike should be delivered (the axon number). The time in the packet is added to the axonal delay for the specified axon, and this value is compared against the current time. When the time matches, a spike is delivered to the cross bar using a to_crossbar channel. This makes the spike delivery to the crossbar synchronous with the global system clock.

Figure 14:
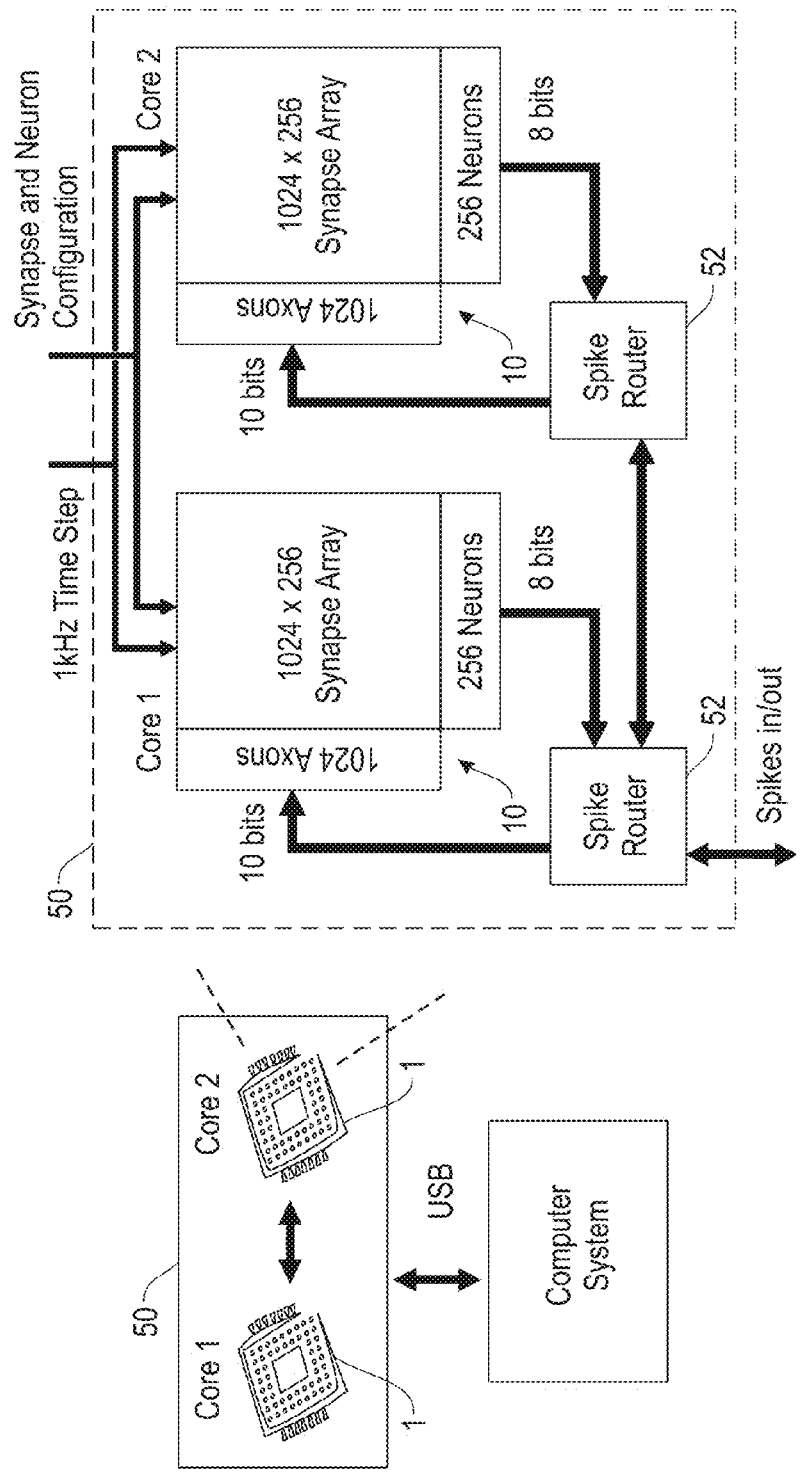
FIG. 14 shows a diagram of a dual core neuromorphic network illustrating event routing, in accordance with an embodiment of the invention.

FIG. 14 shows a dual core neuromorphic network 50 as an example implementation of the neural network 40 of FIG. 13. The network 50 includes two cores 1. In one example of the network 50, each core 1 includes N×N neurons (e.g., N×N<=1024), and each synapse crossbar array in a core 1 includes A×(N×N) synapses (e.g., A<=1024), wherein A represents the number of axons in a core 1. As such, there may be more axons than synapses in a core 1.

For example, in the network 50 each core 1 includes 256 neurons, 1024 axons and 1024×256 synapses (i.e., a 1024×256 crossbar of synapses with a 16×16 array of neurons, wherein N=16 and A=1024). Following spike computation, neurons in each core 1 send out spikes into a spike router 52. Spike events arrive at their target axons and are held there (the axons will drive the neurons in two timesteps. Each spike router 52 may deliver events to target axons within a timestep.

Figure 15:
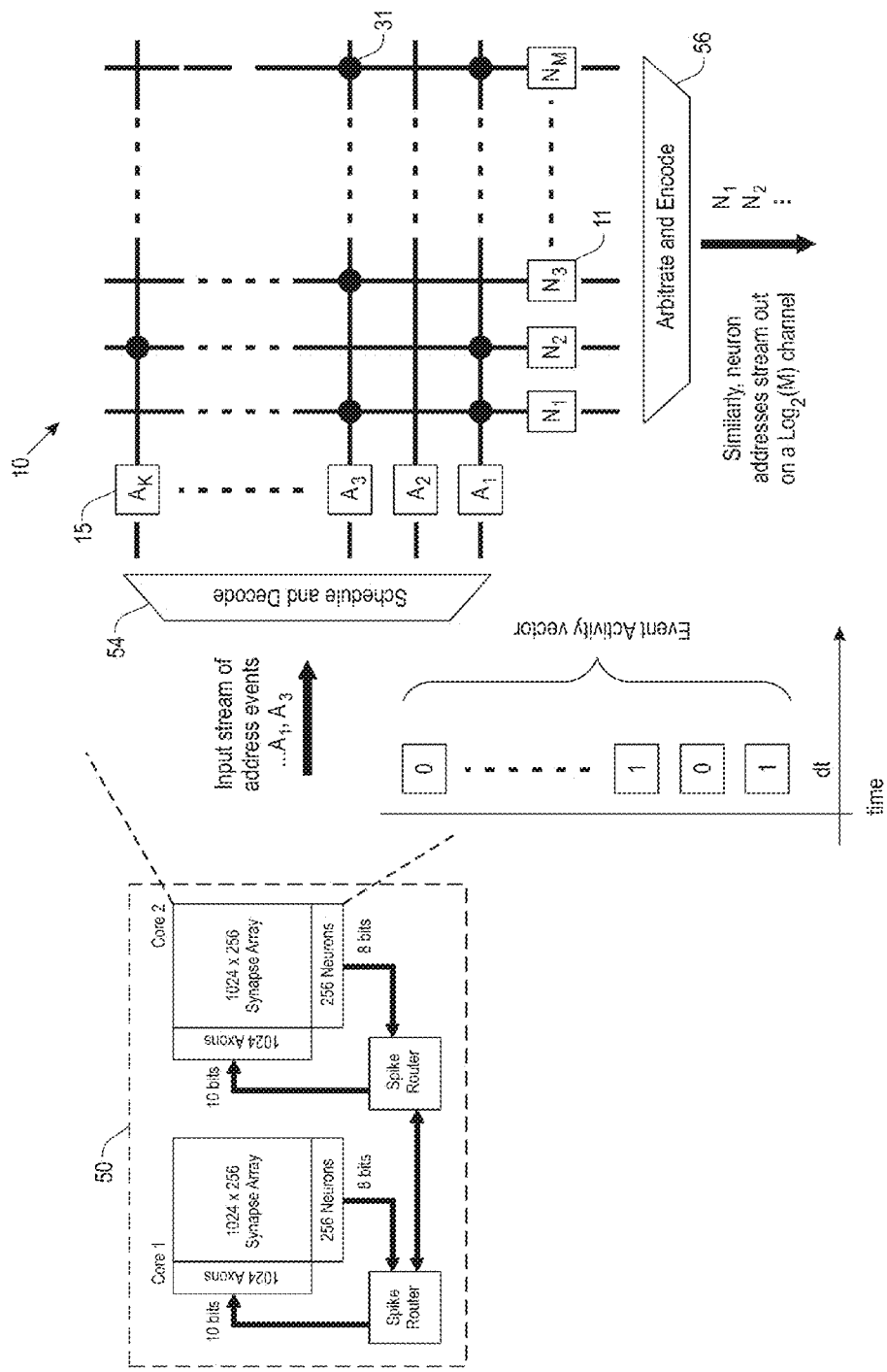
FIG. 15 shows a diagram of an address event interface module for a multi-core neuromorphic network, in accordance with an embodiment of the invention.

FIG. 15 shows an example address event interface (AEI) module implementation for the network 50 of FIG. 14, according to an embodiment of the invention. A core circuit includes a tile circuit 10 comprising axons $A_1, \ldots, A_K$, and neurons $N_1, \ldots, N_M$. The AEI comprises a schedule and decode module 54, and an arbitrate and encode module 56. The schedule and decode module 54 provides scheduler functionality by receiving spike events (packets) and transmitting them to selected axons based on a schedule.

Figure 16:
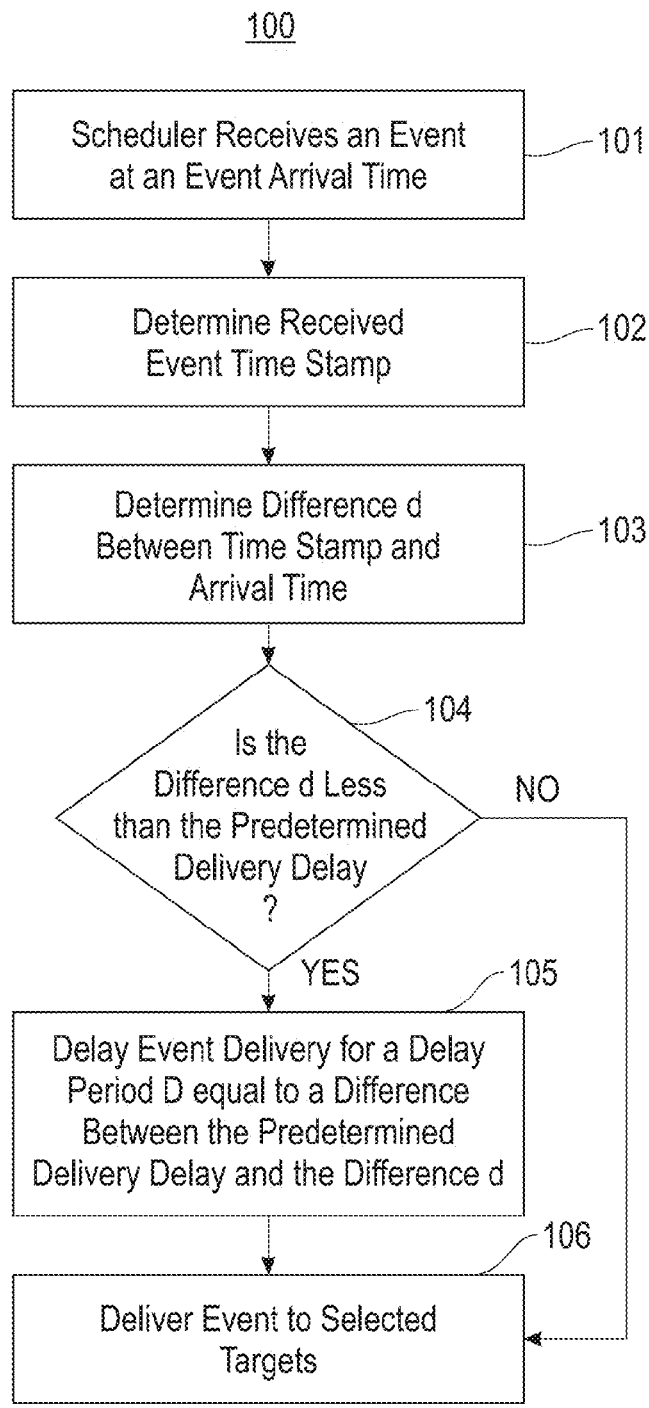
FIG. 16 shows an event scheduling process in a multi-core neuromorphic network, in accordance with an embodiment of the invention.

Events propagate in the network 50 in a non-deterministic manner. Referring to a scheduling process 100 in FIG. 16, the schedule and decode module 54 implements a scheduler that utilizes a scheduling event queue and selectively imposes a delay on received spike events before transmitting them to selected axons to eliminate non-deterministic event delivery times. When an event is generated, it is assigned a time stamp based on a global clock. When an event arrives in the module 54 at an arrival time (process block 101), the time stamp value for the event is determined (process block 102).

Using the arrival time at the module 54 and the event time stamp, it is determined how long the event has spent on route to the module 54 as the difference d between the event arrival time and the event time stamp (process block 103). If the difference d is less than a predetermined delivery delay (or predetermined total delay) n, then the event is held for a delay period D equal to the difference between n and d, to achieve n timestamps from event generation to event delivery (process block 105) and deliver the event at the end of the delay period (process block 106).

As such, the module 54 selectively delays delivering (transmitting) each event as needed to achieve n timestamps from event generation to transmittal for every event. This also allows a hardware implementation to replicate a software implementation of the neuromorphic network. For example, if a spike event requires between 3 and 9 timesteps to propagate in the network 50, the module 54 ensures 9 timesteps for all events. In one example, even if an event arrives at the module 54 within 3 timesteps from generation, the module 54 delays transmission of that event by 6 timesteps such that the event is transmitted from the module 54 at end of 9 timesteps from generation.

In another example, if an event arrives at the module 54 within 7 timesteps from generation, the module 54 delays transmission of that event by 2 timesteps such that the event is transmitted from the module 54 at end of 9 timesteps from generation. In another example, if an event arrives at the module 54 within 9 timesteps from generation, the module 54 does not delay transmission of that event. As such, the module 54 ensures a consistent delivery schedule for events as n timesteps from generation (n=9 in the above examples), eliminating random event delivery times.

The arbitrate and encode module 56 transmits spike events (packets) corresponding to any neuron 11 that spiked. Address events encode locations of "1's" using a shared $Log_2$ (K) channel. When activity is sparse (i.e., event rate<$(Log_2(K) dt)^{-1}$), using address events is more efficient than sending event activity vectors. Event generation and processing are asynchronous.

Figure 17:
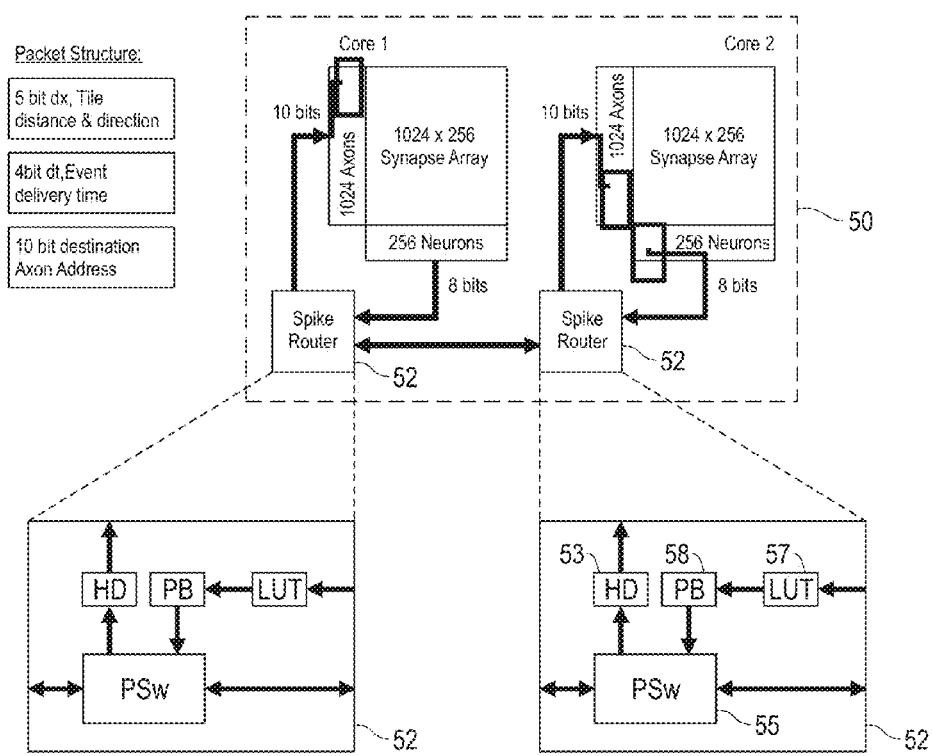
FIG. 17 shows a diagram of address event routing system for a multi-core neuromorphic network, in accordance with an embodiment of the invention.

FIG. 17 shows an example AER system implementation for the network 50 of FIG. 14, according to an embodiment of the invention. The AER system comprises one dimensional (1D) spike routers 52. A spike router 52 includes a neuron events address look-up table (LUT) module 57 retrieving target distance, direction, addresses and delivery time (e.g., about 19 bits/packet×4 packets/neuron). A packet builder (PB) module 58 uses the LUT output to construct outgoing address-event router packets, as described above. A packet switch (PSw) module 55 directs packets to appropriate axon locations. A head delete (HD) module 53 removes routing information from a packet to deliver it as a time stamped axon event. The modules operate in an event-driven and handshake based manner.

Figure 18:
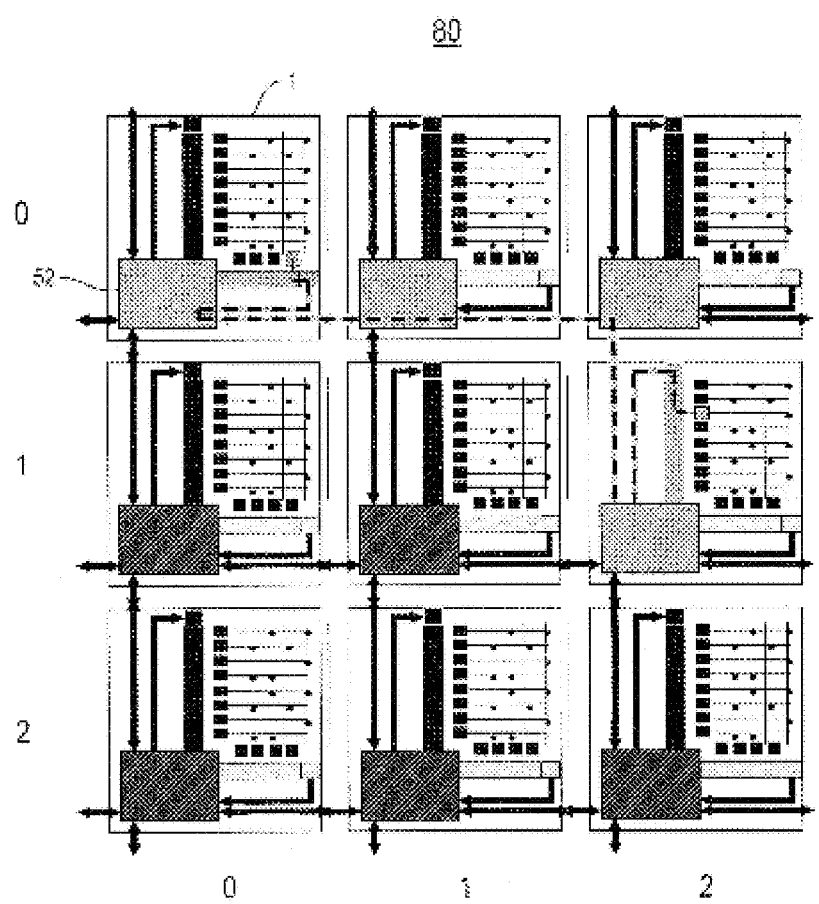
FIG. 18 shows a neuromorphic network 80 comprising nine cores arranged in an array, illustrating packet event traversal, in accordance with an embodiment of the invention.

FIG. 18 shows an example neuromorphic network 80 comprising cores arranged in a 3×3 array, wherein each core maybe identified by its Cartesian coordinates as core (i,j) wherein i is a column index and j is a row index in the array (i.e., core (0,0), core (0, 1), ..., (core 2, 2)). FIG. 18 illustrates an example wherein a spike event generated by a neuron in the core (0,0) is routed from that neuron to an axon in the core (2, 1), as shown by the dashed lines. Specifically, the event traverses two cores horizontally (i.e., from core (0,0) to core (1,0) and onto core (2,0)) and one core vertically (i.e., from core (2,0) to core (2, 1)) via spike routers 52. The routers 52 provide a hierarchical address-event multichip mesh router system, as a deadlock-free dimension-order routing (DR). Target locations are stored in a LUT in each router 52. Target address-events are packetized and routed to cores in the network. Packets destined for other networks are routed to interchip routers (IR), using the same structure to set target chips/cores/axons. Interchip LUT information can be compact as it routes events from the same region, grouped into fascicles (bundles of axons) and receives identical routes (but different target axons). This allows parameterized chip compiler variants (number of cores, neurons and axons per core, STDP or NO-STDP, etc.) that can be generated on the fly. According to an embodiment of the invention, several cores share a single router, wherein in one example, each set of 4 cores has 1 router, such that a 1024 core network has 256 routers.

Figure 19:
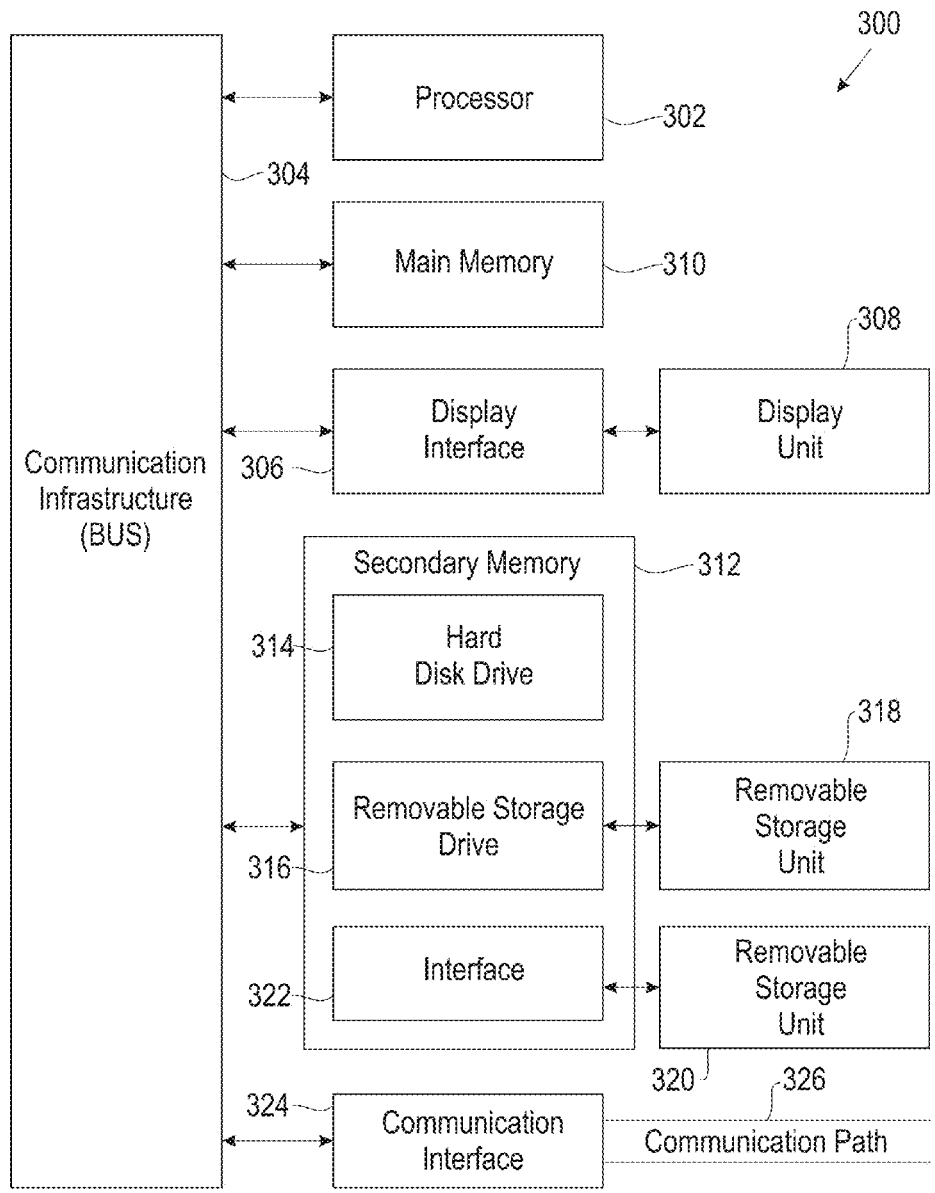
FIG. 19 shows a high level block diagram of an information processing system useful for implementing one embodiment of the present invention.

FIG. 19 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for neuromorphic event-driven neural computing in a scalable neural network. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neural network, comprising:
   a plurality of interconnected core circuits, each core circuit comprising:
   an electronic synapse array comprising multiple digital synapses interconnecting a plurality of digital electronic neurons, wherein each synapse interconnects an axon of a pre-synaptic neuron with a dendrite of a post-synaptic neuron, wherein each neuron integrates input spikes and generates a spike event in response to the integrated input spikes exceeding a potentiation threshold, and wherein each spike event includes a corresponding timestamp indicating generation of the spike event; and
   a scheduler that receives one or more spike events targeting one or more axons in the synapse array, and selectively imposes a delay on the spike events received before delivering the spike events to the axons, wherein, for each spike event received, the scheduler delivers the spike event to a selected axon in the synapse array based on a schedule for deterministic event delivery and a corresponding timestamp of the spike event.

2. The neural network of claim 1, wherein the scheduler delivers the spike event to a selected axon in the synapse array after a delay period.

3. The neural network of claim 2, wherein the delay period is based on a timestamp indicating generation of the spike event and a predetermined delay for event delivery.

4. The neural network of claim 1, wherein the scheduler selectively imposes a delay on delivery of the received spike events for deterministic event delivery.

5. The neural network of claim 1, wherein the events are delivered with the same propagation period from event generation.

6. The neural network of claim 1, further comprising an intra-circuit event router for one or more core circuits, wherein the intra-circuit event router routes events from a spiking neuron to a destination axon in the synapse array.

7. The neural network of claim 6, further comprising an event routing system interconnecting the core circuits.

8. The neural network of claim 7, wherein the event routing system comprises a plurality of inter-circuit event routers that route events between core circuits.

9. A non-transitory computer-useable storage medium for event delivery in a neural network including multiple core modules, wherein each core module includes an electronic synapse array comprising multiple digital synapses interconnecting a plurality of digital electronic neurons such that each synapse interconnects an axon of a pre-synaptic neuron with a dendrite of a post-synaptic neuron, said medium having a computer-readable program, wherein the program upon being processed on a computer causes the computer to implement the steps of:
   integrating input spikes in an integrate and fire digital neuron, and in response to the integrated inputs exceeding a threshold, generating and sending a spike event to digital synapses interconnecting the neuron to other neurons via the synapse array, wherein each spike event includes a corresponding timestamp indicating generation of the spike event;
   receiving one or more spike events targeting one or more axons in the synapse array, and selectively imposing a delay on the spike events received before delivering the spike events to the axons, wherein, for each spike event received, the spike event is delivered to a selected axon in the synapse array based on a schedule for deterministic event delivery and a corresponding timestamp of the spike event.

10. The non-transitory computer-useable storage medium of claim 9, wherein the program upon being processed on a computer causes the computer to further implement the steps of:
    delivering the spike event to a selected axon in the synapse array after a delay period.

11. The non-transitory computer-useable storage medium of claim 10, wherein the delay period is based on a timestamp indicating generation of the spike event and a predetermined delay for event delivery.

12. The non-transitory computer-useable storage medium of claim 9, wherein the program upon being processed on a computer causes the computer to further implement the steps of:
    selectively imposing a delay on delivery of the received spike events for deterministic event delivery.

* * * * *

UNITED STATES PATENT AND TRADEMARK OFFICE
CERTIFICATE OF CORRECTION

| | | |
|---|---|---|
| PATENT NO. | : 8,909,576 B2 | Page 1 of 1 |
| APPLICATION NO. | : 13/235341 | |
| DATED | : December 9, 2014 | |
| INVENTOR(S) | : Filipp Akopyan et al. | |

It is certified that error appears in the above-identified patent and that said Letters Patent is hereby corrected as shown below:

Title page, Item 73: Please add additional Assignee -- Cornell University, Ithaca, NY (US) --.

Signed and Sealed this
Eighth Day of December, 2015

Michelle K. Lee
*Director of the United States Patent and Trademark Office*